(12) United States Patent
Sato

(10) Patent No.: US 12,551,192 B2
(45) Date of Patent: Feb. 17, 2026

(54) ULTRASONIC DIAGNOSTIC APPARATUS AND MEDICAL IMAGE PROCESSING APPARATUS

(71) Applicant: CANON MEDICAL SYSTEMS CORPORATION, Tochigi (JP)

(72) Inventor: Takeshi Sato, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 412 days.

(21) Appl. No.: 17/658,753

(22) Filed: Apr. 11, 2022

(65) Prior Publication Data
US 2022/0330920 A1 Oct. 20, 2022

(30) Foreign Application Priority Data
Apr. 16, 2021 (JP) .................................. 2021-069938

(51) Int. Cl.
*A61B 8/00* (2006.01)
*G01S 7/52* (2006.01)
*G01S 15/89* (2006.01)

(52) U.S. Cl.
CPC .......... *A61B 8/5207* (2013.01); *A61B 8/5269* (2013.01); *G01S 7/52033* (2013.01); *G01S 7/52077* (2013.01); *G01S 15/8906* (2013.01)

(58) Field of Classification Search
CPC ......... A61B 8/52; A61B 8/5207; A61B 8/523; A61B 8/5246; A61B 8/5253; A61B 8/5269; A61B 8/58; A61B 8/5215; G01S 7/52017; G01S 7/52077; G01S 7/52023; G01S 7/5205; G01S 7/52085; G01S 7/52095;
(Continued)

(56) References Cited

U.S. PATENT DOCUMENTS 8,568,319 B1 * 10/2013 Kaplan ..................... A61B 8/56
600/407
2012/0289835 A1 * 11/2012 Hwang ............... G01S 7/52047
600/447

(Continued)

FOREIGN PATENT DOCUMENTS

JP 2018-206382 A 12/2018
JP 2020-114295 A 7/2020

OTHER PUBLICATIONS

Zhang et al., "Beyond a Gaussian Denoiser: Residual Learning of Deep CNN for Image Denoising", IEEE Transactions on Image Processing, vol. 26, No. 7, Jul. 2017, 14 Pages.

*Primary Examiner* — Catherine T. Rastovski
*Assistant Examiner* — Matthew W. Baca
(74) *Attorney, Agent, or Firm* — Oblon, McClelland, Maier & Neustadt, L.L.P.

(57) ABSTRACT

An ultrasonic diagnostic apparatus of embodiment includes a receiver circuit and processing circuitry. The receiver circuit performs a first process of multiplying a gain to a received signal in analog form while changing the gain with depth, and performs a second process of converting the received signal subjected to the first process into a received signal in digital form. The processing circuitry performs a third process on the received signal in digital form so that a level of noise included in the received signal in digital form is made constant, and performs a fourth process of reducing the noise included in the received signal on the received signal in digital form subjected to the third process.

9 Claims, 12 Drawing Sheets

(58) Field of Classification Search
CPC .. G01S 7/52033; G01S 7/52036; G01S 7/526; G01S 7/529; G01S 15/8906; G01S 15/8993; G01S 15/8995; G01S 7/52038; G01S 7/52039; G06T 5/70; G06T 5/60; G06T 2207/3004; G16H 30/40
See application file for complete search history.

(56) References Cited

U.S. PATENT DOCUMENTS

| | | | |
|---|---|---|---|
| 2017/0150948 A1* | 6/2017 | Kanayama | A61B 8/488 |
| 2018/0153521 A1* | 6/2018 | Martins | A61B 8/5269 |
| 2018/0349759 A1* | 12/2018 | Isogawa | G06T 5/60 |
| 2020/0064470 A1* | 2/2020 | Qin | A61B 8/0866 |
| 2020/0281570 A1 | 9/2020 | Sato et al. | |
| 2020/0357098 A1* | 11/2020 | Yoo | G16H 50/20 |
| 2021/0352412 A1* | 11/2021 | Suchy | G01S 7/529 |

* cited by examiner

ULTRASONIC DIAGNOSTIC APPARATUS AND MEDICAL IMAGE PROCESSING APPARATUS

CROSS-REFERENCE TO RELATED APPLICATIONS

This application is based upon and claims the benefit of priority from Japanese Patent Application No. 2021-069938, filed on Apr. 16, 2021; the entire contents of which are incorporated herein by reference.

FIELD

Embodiments disclosed in the present specification and the drawings relate to an ultrasonic diagnostic apparatus and a medical image processing apparatus.

BACKGROUND

Ultrasonic waves are attenuated as they propagate through a living body. An attenuation coefficient of ultrasonic waves is about 0.6 dB/cm (reciprocating distance)/MHz in soft tissues. For example, when an echo signal (received signal) from an object at a depth of 5 cm is an ultrasonic wave of 10 MHz, the attenuation is −60 dB (−0.6 [dB/cm/MHz]*(5 [cm]*2)*10 [MHz]). When an object is at a depth of 10 cm, the attenuation is −120 dB. Assuming that the level of thermal noise that is included in a received signal from one element of an ultrasonic diagnostic apparatus and generated in a transducer element or an electronic circuit, that is, the level of white noise is −60 dB, the relation between the received signal and the noise at each depth is illustrated in FIG. 1. FIG. 1 is a diagram illustrates an example of the relation between a received signal and noise at each depth when the level of white noise is −60 dB. In FIG. 1, "signal" indicates the received signal, and "noise" indicates the noise. The same applies to the other drawings. For example, when an analog to digital converter (ADC) included in an ultrasonic diagnostic apparatus is a "14-bit ADC", a dynamic range is 84 dB. Therefore, in such a state, the ultrasonic diagnostic apparatus is not able to input received signals from a shallow part to a deep part into the ADC within the dynamic range of the ADC. Therefore, the ultrasonic diagnostic apparatus performs a process of changing a gain of the received signal, which is an analog signal, with depth. This process is called analog time gain compensation (ATGC).

FIG. 2 is a diagram illustrating an example of the relation between a received signal and noise when an ultrasonic diagnostic apparatus multiplies a received signal in ATGC by a gain of 6 dB/cm (one-sided distance conversion (depth=1 cm on the horizontal axis is a propagation length of 2 cm in a round trip). Conditions under which it is possible to observe objects up to a depth of 10 cm are considered. From FIG. 1 above, in the received signal from one element, the noise is 60 dB higher than the received signal at a depth of 10 cm. When the number of elements in a probe (ultrasonic probe) is 256, a signal to noise ratio (S/N) is improved by 24 dB by adding all received signals from all elements at a depth part in reception beamforming. This is because when the received signal is added N times, the S/N is improved by the square root of N. Therefore, the noise level after the reception beamforming is −36 dB (=(−60+24) dB). Thus, in order to be able to observe signals at a depth of 10 cm, the S/N needs to be further improved by 36 dB. In terms of depth, since only signals up to a depth of 7 cm after beamforming can be observed in the related art, the S/N needs to be further improved by 36 dB in order to be able to observe signals up to a depth of 10 cm.

As a first method of solving such a problem, that is, improving penetration, a method of adding a plurality of received signals at the same position obtained by transmitting ultrasonic waves to the same position a plurality of times is known. Assuming that a signal is constant and noise changes randomly, the S/N is improved by the square root of N by adding the signal N times. In the example described above, 3,981 additions are required to improve the S/N by 36 dB. Since 3,981 frames are required to perform addition at all points, 66 seconds (=3,981/60) are required when a frame rate is set to 60 fps. However, as a premise of this calculation, an echo signal from a living body is required to be constant, but it is not possible to completely immobilize the living body for 66 seconds, including the movement of pulsation and respiration. Therefore, it is practically not possible to use the first method described above.

As a second method of improving penetration, a method of transmitting a pulse having a long wave length to input a large amount of energy and performing pulse compression at the time of reception is known. However, in order to improve the S/N by 36 dB, it is necessary to transmit a pulse that is 3,981 times longer. Therefore, 3,981 times the period of one wavelength of a 10 MHz ultrasonic wave is 398 µs, which is a propagation distance of 30 cm only by the pulse length. Therefore, it is practically not possible to use the second method described above.

A third method of improving penetration is to apply a spatial low-pass filter on a received signal. Since noise is spatially random, it can be reduced by the spatial low-pass filter. When a simple additive average filter is used as such a low-pass filter, a two-dimensional filter with a width of 63×63 (approximately 3,981) is required to improve the S/N by 36 dB. However, when such a relatively wide two-dimensional filter is applied to the received signal, the blur of the received signal applied with the two-dimensional filter becomes relatively large. Therefore, it is practically not possible to use the third method described above.

As a fourth method of improving penetration, there is a method of reducing noise by using a deep neural network (DNN) applied in recent years. Particularly, the effectiveness of a convolutional neural network (CNN) has been shown in the field of image processing. This CNN has also been used for noise reduction. The CNN can be used to learn an ideal received signal when there are various reflectors, and to remove noise that deviates from the properties of the ideal received signal. However, when the CNN is used, a kernel is the same in all regions. Therefore, the statistical properties of the received signal need be the same in all regions. However, in the case of an ultrasonic signal (received signal obtained by an ultrasonic diagnostic apparatus), the properties of the ultrasonic signal change greatly depending on the position in each of a depth direction (propagation direction of an ultrasonic wave) and an azimuth direction (direction orthogonal to the propagation of the ultrasonic wave).

FIG. 3 is a diagram for explaining an example of resolution. As illustrated in FIG. 3, the resolution in the azimuth direction (azimuth resolution) is high in the vicinity of a transmission focus point, but the azimuth resolution is poor at a shallow part or a deep part due to large lateral flow in the azimuth direction. Furthermore, the lateral flow is larger at an end of a probe than in the vicinity of the center of the probe, resulting in poor azimuth resolution. Under such conditions, even though the learning of CNN is performed, a noise reduction effect is small, and signals may be further deteriorated, which is not suitable.

Some CNNs have been reported to output residuals instead of signals. The CNNs output residuals, that is, noise, from a noisy input image and a noise-free teacher image. Subtracting a residual image from an original image (input image) results in a noise-reduced image. Such a CNN is called a denoising convolutional neural network (DnCNN). For example, it has been reported that there is an improvement in a peak signal to noise ratio (PSNR) of about 32 dB while maintaining an edge of an image.

In the case of DnCNN, since a kernel is the same in all regions, noise needs to have the same statistical properties in the entire region. However, as described with reference to FIG. 2, a noise amplitude in a digital input signal (digital received signal) of the ultrasonic diagnostic apparatus changes depending on the depth. Therefore, it is not possible to apply the DnCNN, which assumes that noise is spatially uniform, to the digital input signal.

As a countermeasure when noise during learning and noise during use (during operation) are different, there is a method of adjusting internal parameters of a neural network during use. However, this method assumes that noise is spatially uniform.

DETAILED DESCRIPTION

Figure 1:
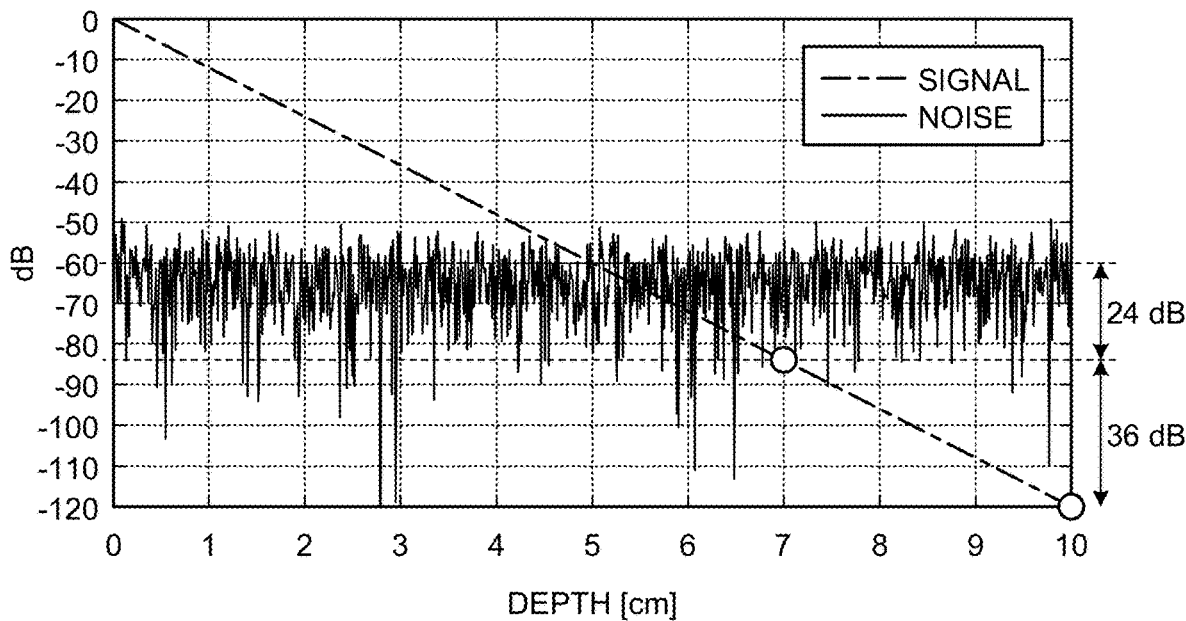
FIG. 1 is a diagram illustrates an example of the relation between a received signal and noise at each depth when the level of white noise is −60 dB.
Figure 2:
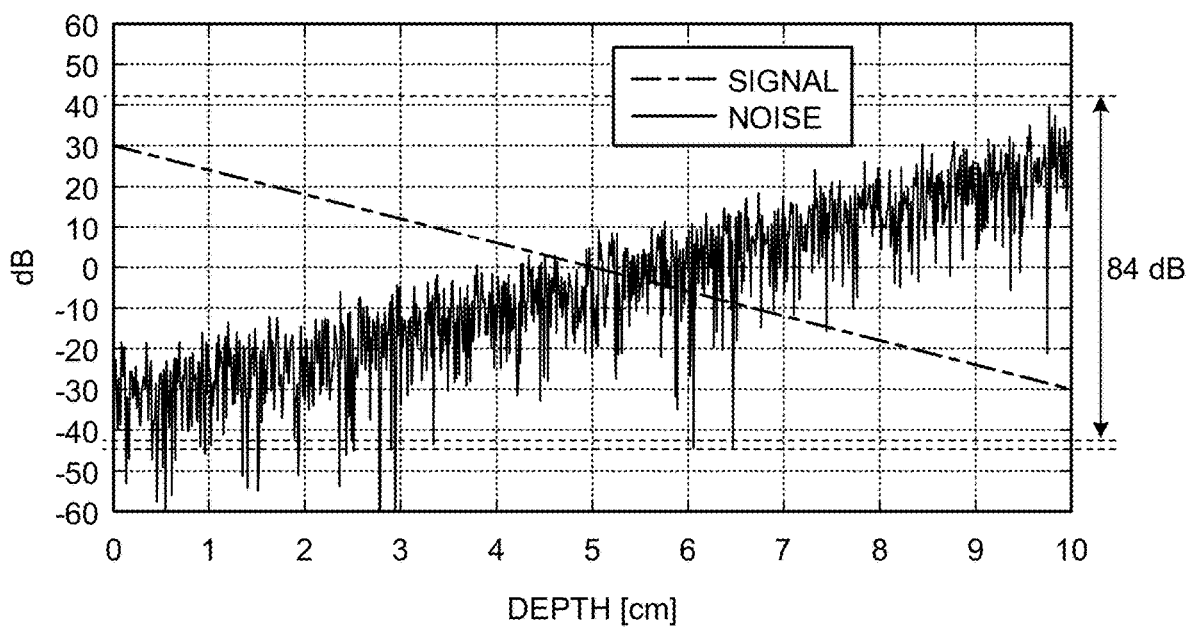
FIG. 2 is a diagram illustrating an example of the relation between a received signal and noise when an ultrasonic diagnostic apparatus multiplies to a received signal in ATGC by a gain of 6 dB/cm (one-sided distance conversion)
Figure 3:
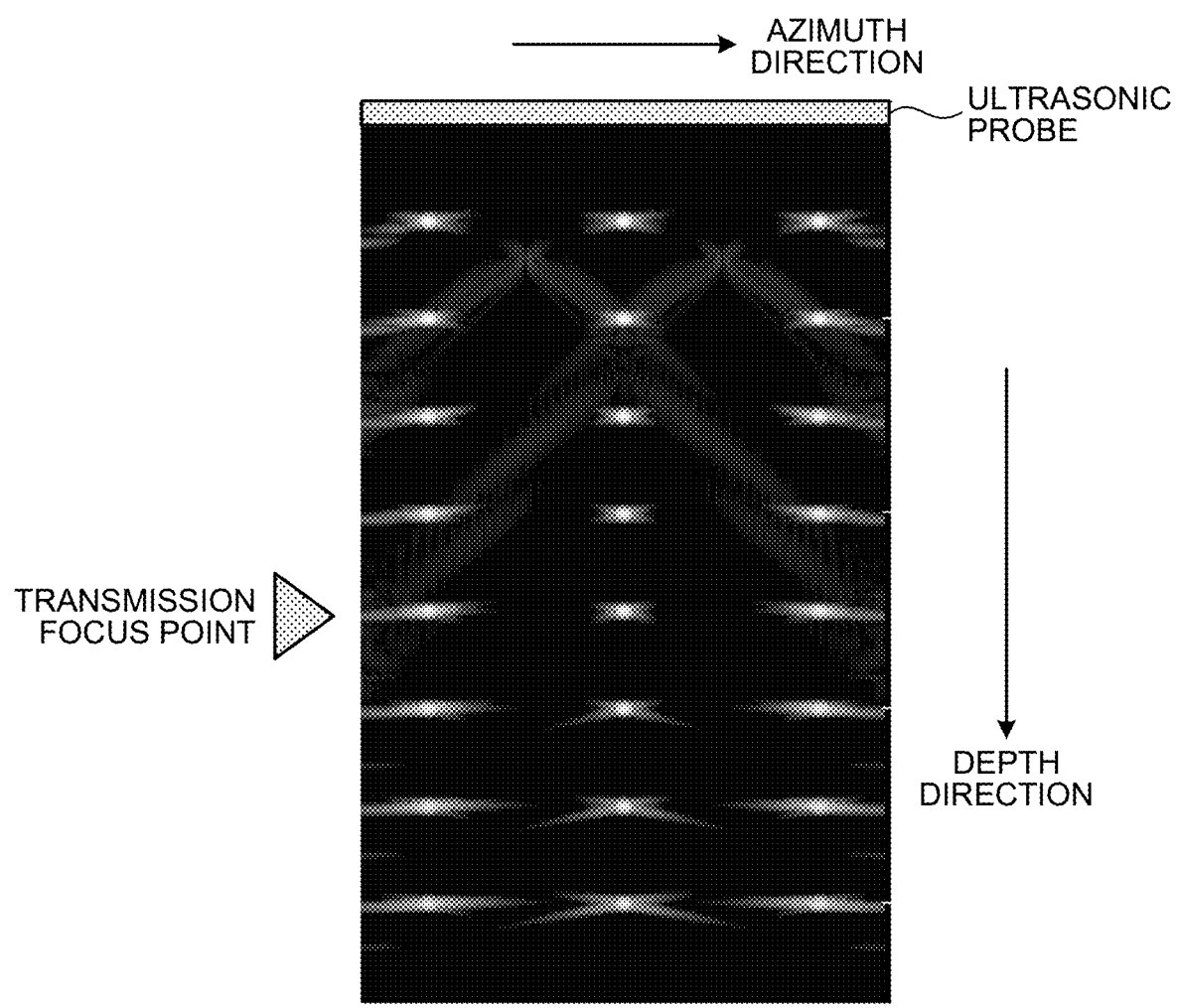
FIG. 3 is a diagram for explaining an example of resolution.

One of the problems to be solved by embodiments disclosed in the present specification and the drawings is to effectively reduce noise. However, the problems to be solved by the embodiments disclosed in the present specification and the drawings are not limited to the above problems. Problems corresponding to each effect by each configuration illustrated in embodiments to be described below can be positioned as other problems.

An ultrasonic diagnostic apparatus of embodiment includes a receiver circuit and processing circuitry. The receiver circuit performs a first process of multiplying a gain to a received signal in analog form while changing the gain with depth, and performs a second process of converting the received signal subjected to the first process into a received signal in digital form. The processing circuitry performs a third process on the received signal in digital form so that a level of noise included in the received signal in digital form is made constant, and performs a fourth process of reducing the noise included in the received signal on the received signal in digital form subjected to the third process.

Hereinafter, an ultrasonic diagnostic apparatus and a medical image processing apparatus according to embodiments will be described with reference to the drawings. The embodiments can be combined with the related art, other embodiments, or other modifications within the range in which there is no contradiction in the content. Similarly, modifications can be combined with the related art, other embodiments, or other modifications within the range in which there is no contradiction in the content. Furthermore, in the following description, common reference numerals may be given to the same components and redundant description may be omitted.

First Embodiment

Figure 4:
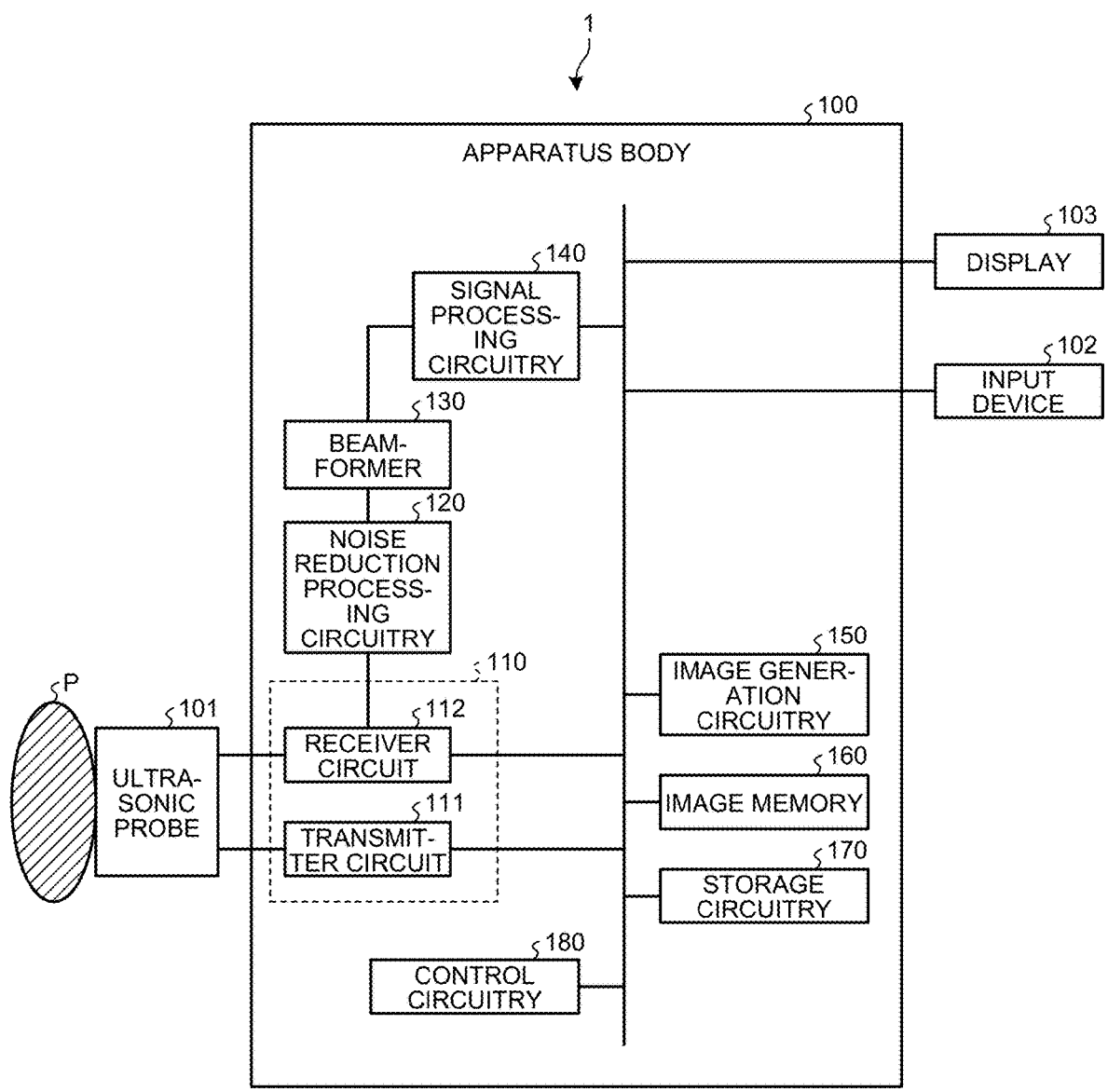
FIG. 4 is a block diagram illustrating a configuration example of an ultrasonic diagnostic apparatus according to a first embodiment.

FIG. 4 is a block diagram illustrating a configuration example of an ultrasonic diagnostic apparatus 1 according to a first embodiment. As illustrated in FIG. 4, the ultrasonic diagnostic apparatus 1 according to the first embodiment includes an apparatus body 100, an ultrasonic probe 101, an input device 102, and a display 103.

The ultrasonic probe 101 includes, for example, a plurality of transducer elements (piezoelectric elements). These transducer elements generate ultrasonic waves on the basis of a driving signal supplied from a transmitter circuit 111 of a transmitter/receiver circuit 110 included in the apparatus body 100. Specifically, when a voltage (transmission drive voltage) is applied by the transmitter circuit 111, the transducer elements generate ultrasonic waves with a waveform corresponding to the transmission drive voltage. Furthermore, the ultrasonic probe 101 receives a reflected wave from a subject P, converts the reflected wave into a reflected wave signal (received signal), which is an electrical signal, and outputs (transmits) the reflected wave signal to the apparatus body 100. Furthermore, the ultrasonic probe 101 includes, for example, a matching layer provided to the transducer element, a backing material for preventing propagation of ultrasonic waves from the transducer element to the rear, and the like. The ultrasonic probe 101 is detachably connected to the apparatus body 100.

When ultrasonic waves are transmitted from the ultrasonic probe 101 to the subject P, the transmitted ultrasonic waves are sequentially reflected on a discontinuous acoustic impedance surface of body tissues of the subject P, and are received as reflected waves by the transducer elements of the ultrasonic probe 101. The amplitudes of the received reflected waves depend on an acoustic impedance difference in the discontinuous surface where the ultrasonic waves are reflected. When the transmitted ultrasonic pulse is reflected on moving blood flow or the surface of a cardiac wall or the like, the reflected wave undergoes a frequency shift due to the Doppler effect, depending on a velocity component of a moving object with respect to the ultrasonic transmission direction. Then, the ultrasonic probe 101 transmits the reflected wave signal to a receiver circuit 112 of the transmitter/receiver circuit 110 to be described below.

The ultrasonic probe 101 is detachable from the apparatus body 100. When scanning a two-dimensional region in the subject P (two-dimensional scanning), an operator connects, for example, a 1D array probe, in which a plurality of transducer elements are arranged in a row, to the apparatus body 100 as the ultrasonic probe 101. Examples of the type of the 1D array probe include linear ultrasonic probes, convex ultrasonic probes, sector ultrasonic probes, and the like. Furthermore, when scanning a three-dimensional region in the subject P (three-dimensional scanning), an operator connects, for example, a mechanical 4D probe or 2D array probe to the apparatus body 100 as the ultrasonic probe 101. The mechanical 4D probe can perform two-dimensional scanning using a plurality of transducer elements arranged in a row like the 1D array probe, and can perform three-dimensional scanning by swing the transducer elements at a predetermined angle (swing angle). Furthermore, the 2D array probe can perform three-dimensional scanning by a plurality of transducer elements arranged in a matrix form, and can perform two-dimensional scanning by focusing and transmitting ultrasonic waves.

The input device 102 is implemented by input means such as a mouse, a keyboard, a button, a panel switch, a touch command screen, a foot switch, a trackball, and a joystick. The input device 102 receives various setting requests from an operator of the ultrasonic diagnostic apparatus 1, and transfers the received various setting requests to the apparatus body 100.

The display 103 displays, for example, a graphical user interface (GUI) for the operator of the ultrasonic diagnostic apparatus 1 to input various setting requests using the input device 102, or displays ultrasonic images or the like based on ultrasonic image data generated by the apparatus body 100. The display 103 is implemented by a liquid crystal monitor, a cathode ray tube (CRT) monitor, or the like.

The apparatus body 100 generates ultrasonic image data on the basis of the reflected wave signal transmitted from the ultrasonic probe 101. The ultrasonic image data is an example of image data. The apparatus body 100 can generate two-dimensional ultrasonic image data on the basis of the reflected wave signal transmitted from the ultrasonic probe 101 and corresponding to the two-dimensional region of the subject P. Furthermore, the apparatus body 100 can generate three-dimensional ultrasonic image data on the basis of the reflected wave signal transmitted from the ultrasonic probe 101 and corresponding to the three-dimensional region of the subject P. As illustrated in FIG. 4, the apparatus body 100 includes the transmitter/receiver circuit 110, noise reduction processing circuitry 120, a beamformer 130, signal processing circuitry 140, image generation circuitry 150, an image memory 160, storage circuitry 170, and control circuitry 180.

The transmitter/receiver circuit 110 causes the ultrasonic probe 101 to transmit ultrasonic waves and to receive reflected waves of the ultrasonic waves, under the control of the control circuitry 180. That is, the transmitter/receiver circuit 110 performs scanning through the ultrasonic probe 101. The Scanning is also referred to as scan, ultrasonic scan, or ultrasonic scanning. The transmitter/receiver circuit 110 is an example of a transmitter/receiver unit. The transmitter/receiver circuit 110 has the transmitter circuit 111 and the receiver circuit 112.

The transmitter circuit 111 supplies a driving signal to the ultrasonic probe 101 and causes the ultrasonic probe 101 to transmit ultrasonic waves, under the control of the control circuitry 180. The transmitter circuit 111 includes a rate pulser generation circuit, a transmission delay circuit, and a transmission pulser. When scanning the two-dimensional region in the subject P, the transmitter circuit 111 causes the ultrasonic probe 101 to transmit an ultrasonic beam for scanning the two-dimensional region. Furthermore, when scanning the three-dimensional region in the subject P, the transmitter circuit 111 causes the ultrasonic probe 101 to transmit an ultrasonic beam for scanning the three-dimensional region.

The rate pulser generation circuit repeatedly generates rate pulses for forming transmission ultrasonic wave (transmission beam) at a predetermined rate frequency (pulse repetition frequency (PRF)) under the control of the control circuitry 180. As the rate pulse goes through the transmission delay circuit, a voltage is applied to the transmission pulsar with different transmission delay times. For example, the transmission delay circuit gives a transmission delay time for each transducer element, which is required to determine transmission directivity by focusing the ultrasonic waves generated from the ultrasonic probe 101 into a beam shape, to each rate pulse generated by the rate pulser generation circuit. The transmission pulser supplies a driving signal (driving pulse) to the ultrasonic probe 101 at a timing based on the rate pulse. The transmission delay circuit arbitrarily adjusts the transmission direction of ultrasonic waves from a transducer element surface by changing the transmission delay time given to each rate pulse.

The driving pulse is transmitted from the transmission pulser to the transducer element in the ultrasonic probe 101 through a cable, and then is converted from an electrical signal into a mechanical vibration in the transducer element. That is, as a voltage is applied to the transducer element, it vibrates mechanically. Ultrasonic waves generated by this mechanical vibration are transmitted to the inside of a living body. Ultrasonic waves having different transmission delay times for each transducer element are focused and propagate in a predetermined direction.

The transmitter circuit 111 has a function of instantaneously changing a transmission frequency, a transmission drive voltage, and the like in order to execute a predetermined scanning sequence under the control of the control circuitry 180. Particularly, the transmission drive voltage is changed by a linear amplifier type transmitter circuit capable of instantaneously switching the value of the transmission drive voltage or a mechanism that electrically switches a plurality of power supply units.

The reflected waves of the ultrasonic waves transmitted by the ultrasonic probe 101 reach the transducer elements inside the ultrasonic probe 101, are converted from mechanical vibrations to electrical signals (reflected wave signals) in the transducer elements, and then are input to the receiver circuit 112. That is, the reflected wave signals in analog form are input to the receiver circuit 112. The receiver circuit 112 includes a low noise amplifier (LNA), an analog time gain compensation (ATGC) processing circuit, an analog to digital converter (ADC), a demodulator, and the like, and performs various types of processing on the reflected wave signals transmitted from the ultrasonic probe 101, thereby generating an in-phase signal (I signal, I: in-phase) and an orthogonal signal (Q signal, Q: quadrature-phase) in a baseband band as reflected wave signals in digital form. The I signal and Q signal are referred to as an IQ signal. Then, the receiver circuit 112 transmits the generated IQ signal to the noise reduction processing circuitry 120. Details of the receiver circuit 112 will be described below.

The noise reduction processing circuitry 120 receives the IQ signal transmitted by the receiver circuit 112, for each channel. Then, the noise reduction processing circuitry 120 reduces noise included in the received IQ signal and transmits the IQ signal with reduced noise to the beamformer 130. One channel corresponds to one transducer element or a plurality of transducer elements. Hereinafter, a case where one channel corresponds to one transducer element will be described as an example. The noise reduction processing circuitry 120 is implemented by a processor, for example. Details of the noise reduction processing circuitry 120 will be described below.

The beamformer 130 generates reflected wave data by performing a phasing addition process (delay addition process) on the IQ signal transmitted by the noise reduction processing circuitry 120. For example, the beamformer 130 gives a delay time required for determining reception directivity to the IQ signal for each channel. Then, the beamformer 130 generates reflected wave data by adding the IQ signals given the delay times. The beamformer 130 transmits the generated reflected wave data to the signal processing circuitry 140.

The signal processing circuitry 140 receives the reflected wave data transmitted by the beamformer 130, performs various types of signal processing on the received reflected wave data, and transmits the reflected wave data subjected to various types of signal processing to the image generation circuitry 150 as B-mode data or Doppler data. The signal processing circuitry 140 is implemented by a processor, for example. The signal processing circuitry 140 is an example of a signal processing unit. Hereinafter, an example of various types of signal processing performed by the signal processing circuitry 140 will be described.

For example, the signal processing circuitry 140 performs various types of processing, such as envelope detection processing and logarithmic compression, on the reflected wave data to generate B-mode data in which the signal intensity (amplitude intensity) at each sample point is expressed by luminance brightness. For example, the signal processing circuitry 140 includes an envelope detector, a logarithmic compressor, and the like. For example, the envelope detector detects an envelope of the reflected wave data, and the logarithmic compressor logarithmically compresses data related to the envelope obtained by the envelope detection (for example, data indicating an amplitude, and the like). The signal processing circuitry 140 transmits the generated B-mode data to the image generation circuitry 150.

Furthermore, the signal processing circuitry 140 performs signal processing for performing harmonic imaging for visualizing harmonic components. Examples of the harmonic imaging include contrast harmonic imaging (CHI) and tissue harmonic imaging (THI). In the contrast harmonic imaging and the tissue harmonic imaging, the following methods are known as scan methods. For example, such scan methods include amplitude modulation (AM), phase modulation (PM) called a pulse subtraction method or a pulse inversion method, and AMPM for obtaining both the effect of the AM and the effect of the PM by combining the AM and the PM, and the like.

Furthermore, the signal processing circuitry 140 extracts motion information of moving objects (blood flow, tissues, contrast agent echo components, and the like) based on the Doppler effect from the reflected wave data by frequency analysis of the reflected wave data, and generates Doppler data indicating the extracted motion information. For example, the signal processing circuitry 140 extracts an average speed, an average dispersion value, an average power value, and the like as the motion information of the moving object at multiple points, and generates Doppler data indicating the extracted motion information of the moving object. The signal processing circuitry 140 transmits the generated Doppler data to the image generation circuitry 150.

Using the functions of the signal processing circuitry 140 described above, the ultrasonic diagnostic apparatus 1 according to the embodiment can perform a color Doppler method also called a color flow mapping (CFM) method. In the color flow mapping method, ultrasonic waves are transmitted and received a plurality of times on a plurality of scanning lines. Then, in the color flow mapping method, a moving target indicator (MTI) filter is applied to a data string at the same position to suppress a signal (clutter signal) derived from a stationary tissue or a slow-moving tissue, thereby extracting a signal (blood flow signal) derived from blood flow from the data string at the same position. Then, in the color flow mapping method, blood flow information such as blood flow speed, blood flow dispersion, and blood flow power is estimated from the blood flow signal. The signal processing circuitry 140 transmits color image data indicating the blood flow information estimated by the color flow mapping method to the image generation circuitry 150. The color image data is an example of Doppler data.

The signal processing circuitry 140 can process both two-dimensional reflected wave data and three-dimensional reflected wave data.

The image generation circuitry 150 generates ultrasonic image data from the B-mode data or the Doppler data transmitted by the signal processing circuitry 140. The image generation circuitry 150 is implemented by a processor.

For example, the image generation circuitry 150 generates two-dimensional B-mode image data, in which the intensity of reflected waves is represented by luminance, from the two-dimensional B-mode data generated by the signal processing circuitry 140. Furthermore, the image generation circuitry 150 generates two-dimensional Doppler image data, in which motion information or blood flow information is visualized, from the two-dimensional Doppler data generated by the signal processing circuitry 140. The two-dimensional Doppler image data in which the motion information is visualized includes velocity image data, dispersion image data, power image data, or image data obtained by combining these data.

The image generation circuitry 150 generally converts (scan-converts) a scanning line signal sequence of ultrasonic scanning into a scanning line signal sequence of a video format represented by a television or the like, and generates ultrasonic image data for display. For example, the image generation circuitry 150 generates ultrasonic image data for display by performing coordinate transformation on the data transmitted by the signal processing circuitry 140 according to the scanning form of ultrasonic waves by the ultrasonic probe 101. Furthermore, the image generation circuitry 150 performs various types of image processing in addition to the scan conversion, for example, image processing (smoothing processing) for regenerating an average value image of luminance, image processing (edge enhancement processing) using a differential filter in an image, and the like by using a plurality of image frames after the scan conversion. Furthermore, the image generation circuitry 150 synthesizes text information of various parameters, scales, body marks, and the like with the ultrasonic image data.

Moreover, the image generation circuitry 150 generates three-dimensional B-mode image data by performing coordinate transformation on the three-dimensional B-mode data generated by the signal processing circuitry 140. Furthermore, the image generation circuitry 150 generates three-dimensional Doppler image data by performing coordinate transformation on the three-dimensional Doppler data generated by the signal processing circuitry 140. That is, the image generation circuitry 150 generates "the three-dimensional B-mode image data and the three-dimensional Doppler image data" as "three-dimensional ultrasonic image data (volume data). Then, the image generation circuitry 150 performs various rendering processes on the volume data in order to generate various two-dimensional image data for displaying the volume data on the display 103.

The rendering process performed by the image generation circuitry 150 includes, for example, a process of generating multi-planer reconstruction (MPR) image data from the volume data by using MPR. Furthermore, the rendering process performed by the image generation circuitry 150 includes, for example, a volume rendering (VR) process of generating two-dimensional image data that reflects three-dimensional information. The image generation circuitry 150 is an example of an image generation unit.

The B-mode data and the Doppler data are ultrasonic image data before the scan conversion process, and the data generated by the image generation circuitry 150 is ultrasonic image data for display after the scan conversion process. The B-mode data and the Doppler data are also called raw data (raw data).

The image memory 160 is a memory that stores various image data generated by the image generation circuitry 150. Furthermore, the image memory 160 stores the data generated by the signal processing circuitry 140. The B-mode data and the Doppler data stored in the image memory 160 can be called by an operator after diagnosis, for example, and become ultrasonic image data for display via the image generation circuitry 150. For example, the image memory 160 is implemented by a semiconductor memory element such as a RAM and a flash memory, a hard disk, or an optical disk.

The storage circuitry 170 stores control programs for scanning (transmission/reception of ultrasonic waves), image processing, and display processing, diagnostic information (for example, patient IDs, doctor's opinions, and the like), diagnostic protocols, and various data such as various body marks. Furthermore, the storage circuitry 170 is also used for storing data stored in the image memory 160, if necessary. For example, the storage circuitry 170 is implemented by a semiconductor memory element such as flash memory, a hard disk, or an optical disk.

The control circuitry 180 controls the entire processing of the ultrasonic diagnostic apparatus 1. Specifically, the control circuitry 180 controls the processing of the transmitter/receiver circuit 110, the noise reduction processing circuitry 120, the beamformer 130, the signal processing circuitry 140, and the image generation circuitry 150 on the basis of various setting requests input by an operator via the input device 102, and various control programs and various data read from the storage circuitry 170. Furthermore, the control circuitry 180 controls the display 103 to display ultrasonic images based on the ultrasonic image data for display stored in the image memory 160. For example, the control circuitry 180 controls the display 103 to display a B-mode image based on the B-mode image data or a color image based on the color image data. Furthermore, the control circuitry 180 controls the display 103 so that the color image is superimposed on the B-mode image and displayed. The control circuitry 180 is an example of a display control unit or a control unit. The control circuitry 180 is implemented by a processor, for example. The ultrasonic image is an example of an image.

Furthermore, the control circuitry 180 controls the ultrasonic scanning by controlling the ultrasonic probe 101 via the transmitter/receiver circuit 110.

Figure 5:
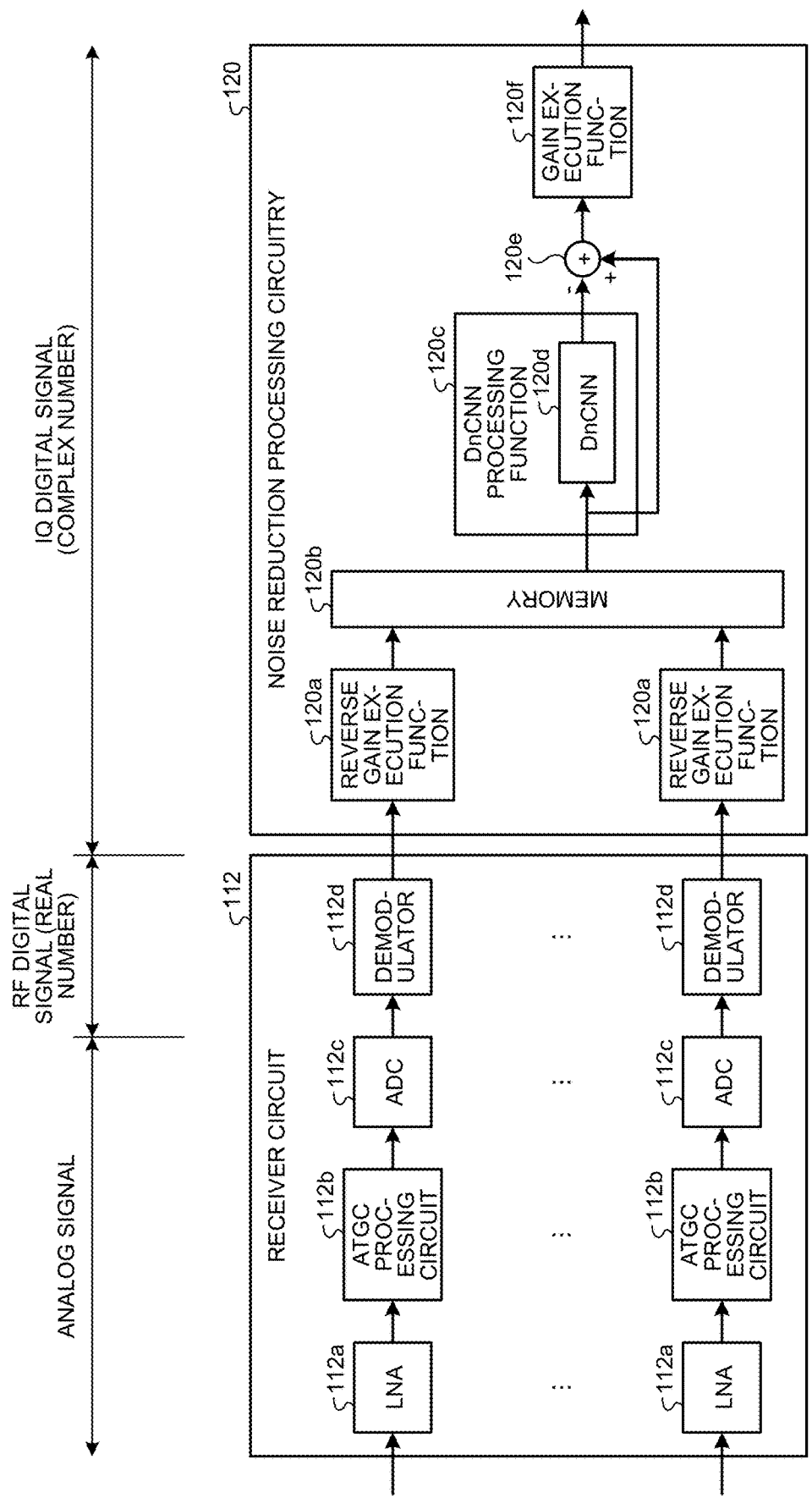
FIG. 5 is a diagram illustrating an example of the configuration of a receiver circuit and noise reduction processing circuitry according to the first embodiment.

So far, the overall configuration of the ultrasonic diagnostic apparatus 1 according to the first embodiment has been described. Next, an example of the configuration of the receiver circuit 112 and the noise reduction processing circuitry 120 will be described. FIG. 5 is a diagram illustrating an example of the configuration of the receiver circuit 112 and the noise reduction processing circuitry 120 according to the first embodiment.

As illustrated in FIG. 5, the receiver circuit 112 includes a plurality of LNAs 112a, a plurality of ATGC processing circuits 112b, a plurality of analog to digital converters (ADCs) 112c, and a plurality of demodulators 112d. For example, the LNAs 112a, the ATGC processing circuits 112b, the ADCs 112c, and the demodulators 112d are provided for each channel. For example, when one channel corresponds to one transducer element, one LNA 112a, one ATGC processing circuit 112b, one ADC 112c, and one demodulator 112d are provided for one transducer element (one channel). Hereinafter, an example of processes (operations) performed by one LNA 112a, one ATGC processing circuit 112b, one ADC 112c, and one demodulator 112d corresponding to one channel will be described, but the same applies to processes performed by the LNA 112a, the ATGC processing circuit 112b, the ADC 112c, and the demodulator 112d corresponding to another channel.

The LNA 112a receives a received signal transmitted by a transducer element corresponding to the LNA 112a, amplifies the received signal with a preset gain, and transmits the amplified received signal to the ATGC processing circuit 112b.

Figure 6A:
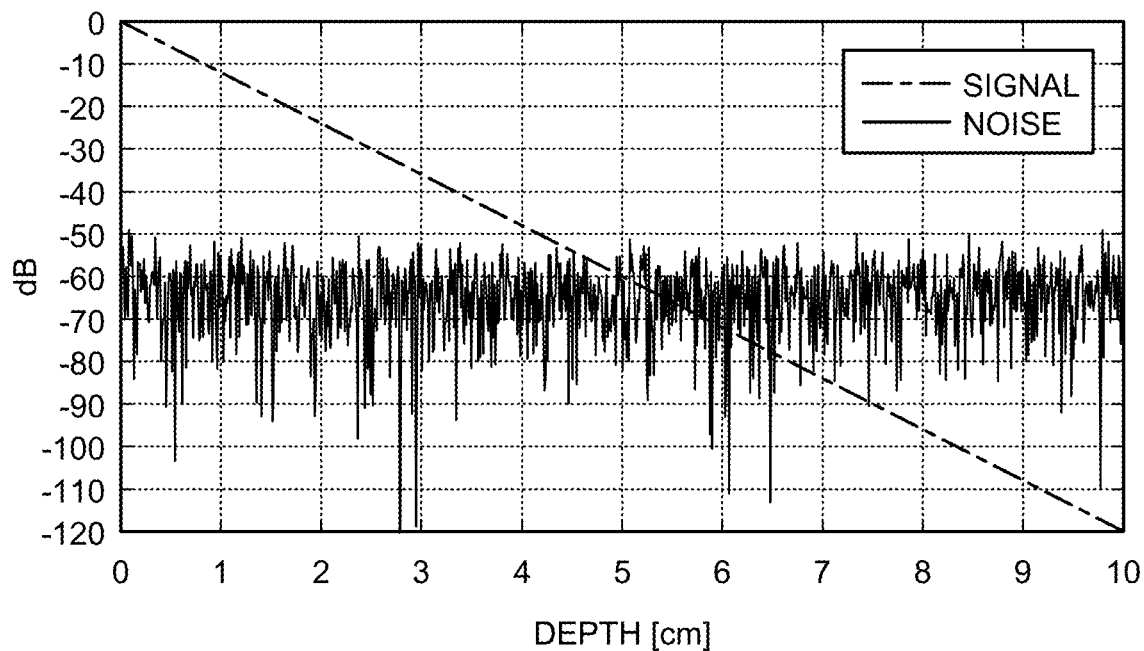
FIG. 6A is a diagram illustrating an example of the relation between a received signal received by LNA according to the first embodiment and a noise level.

FIG. 6A is a diagram illustrating an example of the relation between the received signal received by the LNA 112a according to the first embodiment and the level of noise. For example, FIG. 6A illustrates the relation between a signal and noise at each depth. An attenuation coefficient of ultrasonic waves is about 0.6 dB/cm (reciprocating distance)/MHz in soft tissues. For example, when an echo signal (received signal) from an object at a depth of 5 cm is an ultrasonic wave of 10 MHz, the attenuation is −60 dB as illustrated in FIG. 6A. When an object is at a depth of 10 cm, the attenuation is −120 dB. Assuming that the level of thermal noise that is included in a received signal from one transducer element of the ultrasonic diagnostic apparatus 1 and generated in a transducer element or an electronic circuit, that is, the level of white noise is −60 dB, the relation between the received signal and the noise at each depth is illustrated in FIG. 6A. For example, when the ADC 112c is a "14-bit ADC", a dynamic range is 84 dB. Therefore, in such a state, the ultrasonic diagnostic apparatus 1 is not able to input received signals from a shallow part to a deep part into the ADC 112c within the dynamic range of the ADC 112c.

In this regard, the ATGC processing circuit 112b performs a process (ATGC) of changing a gain of the received signal, which is an analog signal, with depth. Specifically, the ATGC processing circuit 112b multiplies the received signal transmitted by the LNA 112a by a different amount of attenuator with depth. That is, the ATGC processing circuit 112b multiplies a gain to the received signal transmitted by the LNA 112a, by using different gain values with depth. In this way, the ATGC processing circuit 112b amplifies the received signal while changing the gain value according to the elapsed time from the transmission of the ultrasonic waves. Then, the ATGC processing circuit 112b transmits the received signal multiplied by the gain to the ADC 112c.

Figure 6B:
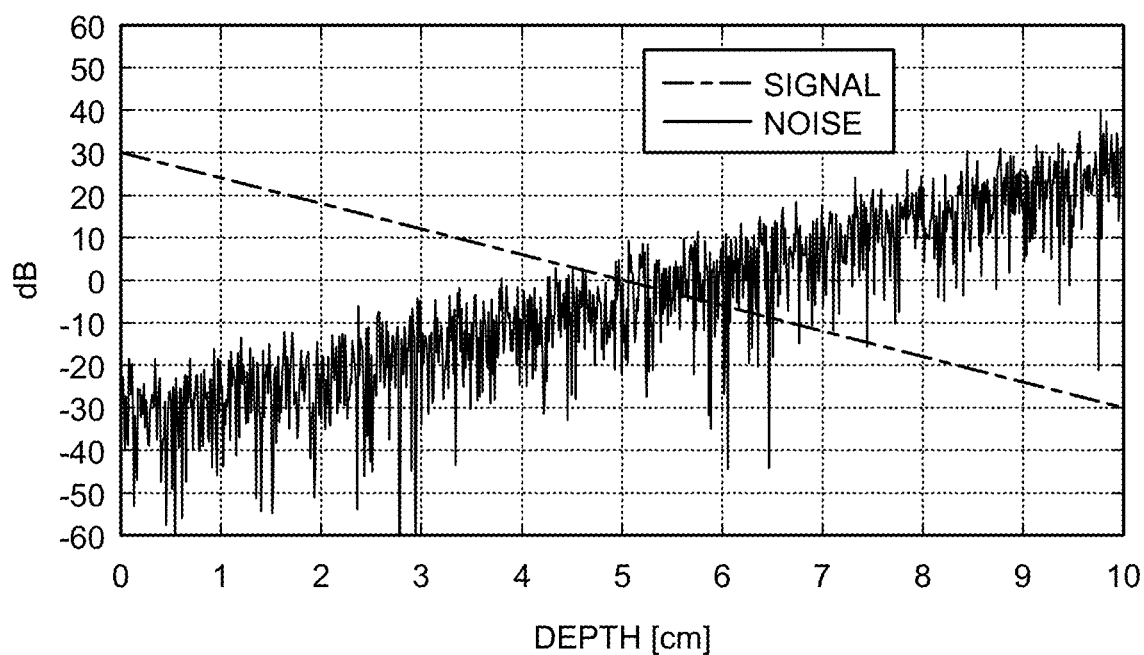
FIG. 6B is a diagram illustrating an example of the relation between a received signal and noise when ATGC processing circuit according to the first embodiment multiplies a gain of 6 dB/cm (one-sided distance conversion) to a received signal in ATGC.

FIG. 6B is a diagram illustrating an example of the relation between a received signal and noise when the ATGC processing circuit 112b according to the first embodiment multiplies a gain of 6 dB/cm (one-sided distance conversion) to the received signal in the ATGC. As illustrated in FIG. 6B, the noise is not spatially uniform because the ATGC was performed on the received signal.

The ADC 112c converts the received signal in analog form transmitted by the ATGC processing circuit 112b into a received signal in digital form. For example, the received signal in digital form after such conversion is a radio frequency (RF) signal. Then, the ADC 112c transmits the RF signal, which is the received signal in digital form, to the demodulator 112d.

The demodulator 112d receives the RF signal transmitted by the ADC 112c. Then, the demodulator 112d converts the RF signal into an I signal and a Q signal in the baseband band by demodulating the received RF signal. Then, the demodulator 112d transmits the IQ signal to the noise reduction processing circuitry 120. The IQ signal is a signal in digital form.

As described above, the receiver circuit 112 according to the first embodiment includes the ATGC processing circuit 112b that performs ATGC that multiplies a gain to a received signal in analog form while changing the gain with depth, and the ADC 112c that performs a process of converting the received signal subjected to the ATGC into a received signal in digital form. The ATGC is an example of a first process. The process of converting the received signal subjected to the ATGC into the received signal in digital form is an example of a second process.

As illustrated in FIG. 5, the noise reduction processing circuitry 120 includes a plurality of reverse gain execution functions 120a, a memory 120b, a DnCNN processing function 120c, a subtractor 120e, and a gain execution function 120f. For example, the reverse gain execution function 120a is provided for each channel. For example, when one channel corresponds to one transducer element, one reverse gain execution function 120a is provided for one transducer element (one channel).

For example, respective processing functions performed by the reverse gain execution functions 120a, the DnCNN processing function 120c, and the gain execution functions 120f, which are components of the noise reduction processing circuitry 120 illustrated in FIG. 5, are recorded in the storage circuitry 170 in the form of computer programs executable by a computer. The noise reduction processing circuitry 120 is, for example, a processor, and reads the computer programs from the storage circuitry 170 and executes the read computer programs, thereby implementing functions corresponding to the executed computer programs. In other words, the noise reduction processing circuitry 120 in the state of reading the computer programs has the functions shown in the noise reduction processing circuitry 120 in FIG. 5.

FIG. 5 illustrates the case where respective processing functions of the reverse gain execution functions 120a, the DnCNN processing function 120c, and the gain execution functions 120f are implemented by a single processing circuitry (noise reduction processing circuitry 120); however, the embodiment is not limited thereto. For example, the noise reduction processing circuitry 120 may be configured by combining a plurality of independent processors, and respective processors may implement respective processing functions by executing respective computer programs. Furthermore, respective processing functions of the noise reduction processing circuitry 120 may be implemented by being appropriately distributed or integrated into a single processing circuit or a plurality of processing circuities.

Each of the reverse gain execution functions 120a receives the IQ signal transmitted by a corresponding demodulator 112d, and multiplies the received IQ signal by a gain opposite to the gain (gain value) multiplied by the ATGC processing circuit 112b. For example, the reverse gain execution function 120a multiplies, for each channel, the IQ signal by the gain by using a reciprocal of the gain (gain value), which is multiplied by the ATGC processing circuit 112b, as a gain value. In this way, the reverse gain execution function 120a performs a process on the IQ signal that is an example of the received signal in digital form so that the level of noise included in the IQ signal is made constant at all depths.

Figure 6C:
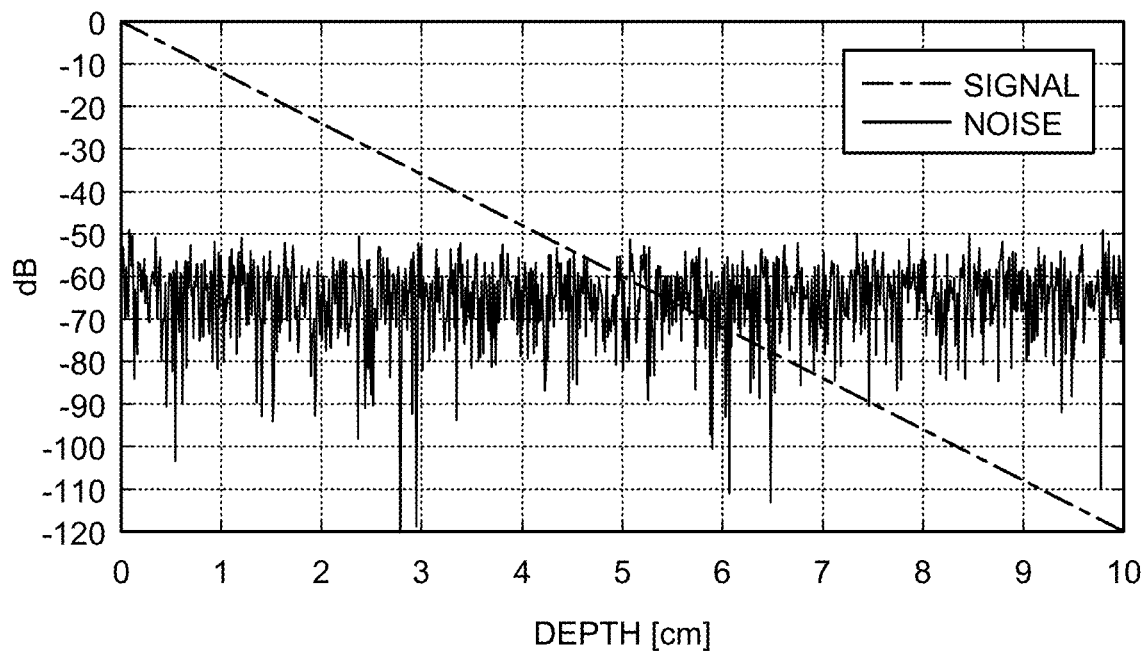
FIG. 6C is a diagram illustrating an example of the relation between an IQ signal multiplied by a gain by a reverse gain execution function according to the first embodiment and noise.

FIG. 6C is a diagram illustrating an example of the relation between the IQ signal multiplied by a gain by the reverse gain execution function 120a according to the first embodiment and noise. As illustrated in FIG. 6C, noise does not change with depth and is spatially uniform. Consequently, the IQ signal multiplied by the gain by the reverse gain execution function 120a can be applied to a DnCNN 120d that estimates noise.

The ADC 112c generates noise called quantization noise. However, the quantization noise does not change with depth. Therefore, further preferably, the reverse gain execution function 120a multiplies the IQ signal by a gain in which the sum of thermal noise that changes with depth due to the ATGC performed by the ATGC processing circuit 112b and the quantization noise that does not change with depth is constant at all depths. However, for example, when the ADC 112c is a "14-bit ADC," the S/N of ADC 112c is about 86 dB (6.02*14+1.76). Therefore, in the case of FIG. 6B, at a depth of 0 cm, the quantization noise may be ignored because it is below the thermal noise. Accordingly, the noise is at a constant level at all depths and all channels.

Then, the reverse gain execution function 120a stores the IQ signal multiplied by the gain in the memory 120b. Specifically, the memory 120b has a two-dimensional storage area composed of a channel axis (channel direction) and a depth axis (depth direction). Then, each of the reverse gain execution functions 120a stores the IQ signal multiplied by the gain at a corresponding position in the storage area of the memory 120b. Accordingly, a two-dimensional IQ signal (two-dimensional data) of the channel and the depth is stored in the storage area of the memory 120b.

The DnCNN processing function 120c includes the DnCNN 120d. For example, the DnCNN 120d is stored in an internal memory of the noise reduction processing circuitry 120. The DnCNN processing function 120c reads the two-dimensional IQ signal stored in the storage area of the memory 120b, and inputs the read two-dimensional IQ signal to the DnCNN 120d. In this way, the DnCNN processing function 120c causes the DnCNN 120d to estimate noise (residual). Furthermore, the DnCNN processing function 120c transmits the read two-dimensional IQ signal to the subtractor 120e.

The DnCNN 120d estimates noise (noise component) included in the input two-dimensional IQ signal, and outputs the estimated noise to the subtractor 120e. For example, the DnCNN 120d is a two-dimensional deep convolutional neural network (DCNN). Various internal parameters, such as coefficients of the DnCNN 120d, are determined in advance by, for example, learning as will be described below. For example, a learning device that performs learning generates a noise-free ultrasonic signal (for example, the IQ signal described above) by an ultrasonic simulator such as "Field II" ([Searched on Apr. 2, 2021], Internet <http://field-ii.dk/>). Then, the learning device adds white noise corresponding to the noise level of the ultrasonic diagnostic apparatus 1 to the ultrasonic signal. The learning device inputs the ultrasonic signal added with the white noise to the DCNN, and learns the DCNN so that output from the DCNN is the white noise added to the ultrasonic signal. Such learning is residual learning called DnCNN. Furthermore, a method for learning the DnCNN 120d is the same as that for learning a neural network that estimates residuals (noise) in NPL 1 (K. Zhang et al, "Beyond a Gaussian Denoiser: Residual Learning of Deep CNN for Image Denoising", IEEE Transactions on Image Processing, Vol. 26, No. 7, 2017) and PTL 1 (JP2018-206382A (published unexamined patent application)).

The input of the DnCNN 120d is an IQ signal of a complex number, but a general deep learning framework does not correspond to a complex number. However, in the first embodiment, the focus is white noise. The white noise is independent in a real part and an imaginary part. Therefore, the DnCNN processing function 120c inputs the real part and the imaginary part of the IQ signal to the DnCNN 120d as independent signals. For example, the DnCNN processing function 120c separately inputs the real part and the imaginary part to the DnCNN 120d.

The noise level of the ultrasonic diagnostic apparatus 1 changes depending on the ultrasonic probe 101 and apparatus conditions (conditions of the ultrasonic diagnostic apparatus 1). Therefore, the learning device may cause the DnCNN 120d to learn at each of a plurality of noise levels and generate, for each noise level, the DnCNN 120d having internal parameters corresponding to each of the noise levels. That is, the learning device may generate a plurality of DnCNNs 120d corresponding to the noise levels. Then, the noise reduction processing circuitry 120 may hold the DnCNNs 120d generated by the learning device, select a DnCNN 120d that matches a noise level corresponding to the ultrasonic probe 101 and the apparatus conditions among the DnCNNs 120d, and estimate noise included in the two-dimensional IQ signal by using the selected DnCNN 120d.

The noise reduction processing circuitry 120 may hold SNR-related data as disclosed in PTL 1 as an index for adjusting the internal parameters of the DnCNN 120d, and adjust the internal parameters of the DnCNN 120d when estimating noise by the same method as that disclosed in PTL 1.

The subtractor 120e subtracts the noise estimated and output by the DnCNN 120d from the two-dimensional IQ signal (original signal) transmitted by the DnCNN processing function 120c. This allows the subtractor 120e to obtain a two-dimensional IQ signal with reduced noise. The two-dimensional IQ signal is two-dimensional data composed of a channel axis (channel direction) and a depth axis (depth direction). Then, the subtractor 120e transmits the two-dimensional IQ signal with reduced noise to the gain execution function 120f.

Figure 6D:
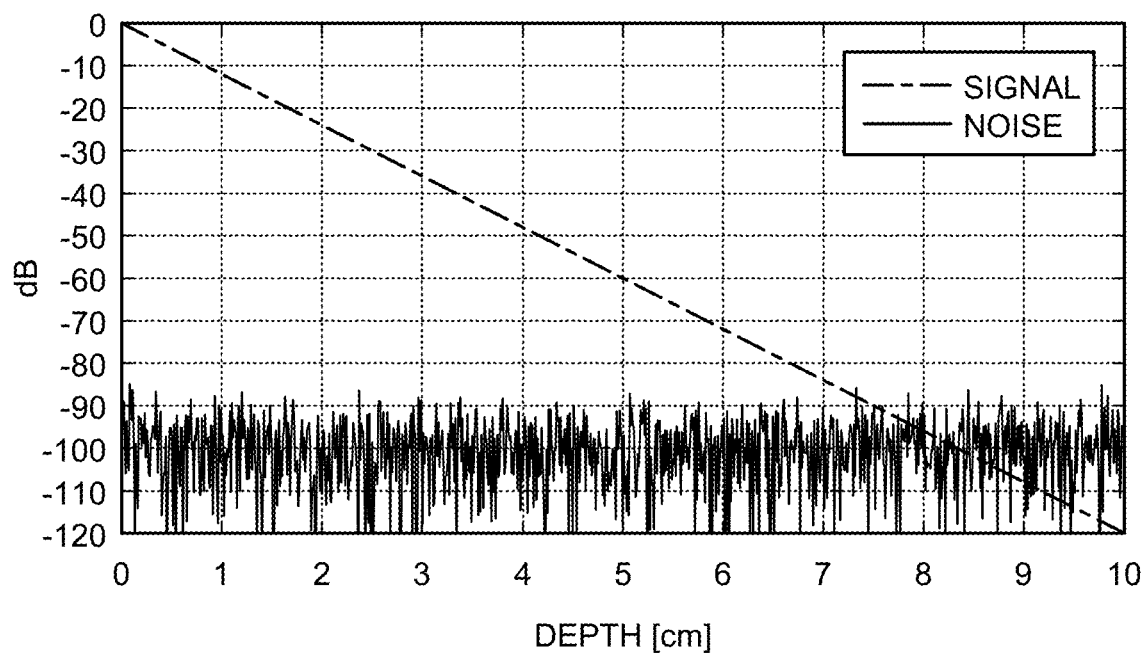
FIG. 6D is a diagram illustrating an example of the relation between an IQ signal output by a subtractor according to the first embodiment and noise.

FIG. 6D is a diagram illustrating an example of the relation between the IQ signal output by the subtractor 120e according to the first embodiment and noise. FIG. 6D illustrates an example of a response in the depth direction. As can be seen by comparing FIG. 6C and FIG. 6D, noise included in the IQ signal is reduced by the subtractor 120e.

The gain execution function 120f multiplies the IQ signal transmitted by the subtractor 120e by a gain opposite to the gain (gain value) multiplied to the IQ signal by the reverse gain execution function 120a. That is, the gain execution function 120f restores the gain. This makes the level of the IQ signal constant or substantially constant at all depths. Then, the gain execution function 120f transmits the IQ signal multiplied by the gain to the beamformer 130.

Figure 6E:
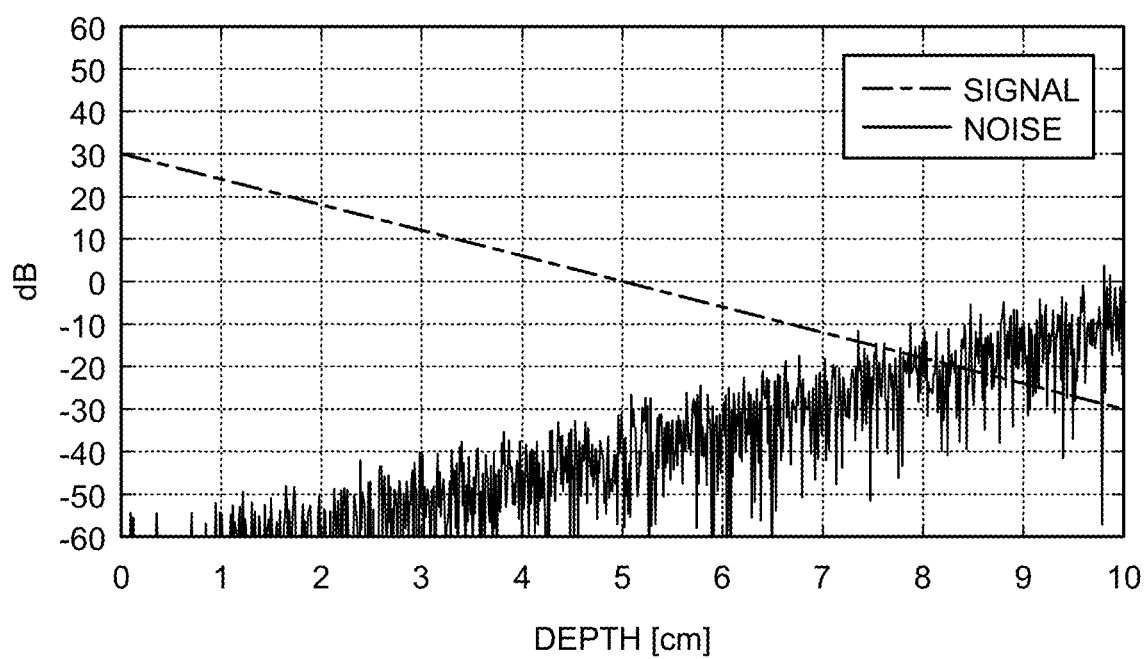
FIG. 6E is a diagram illustrating an example of the relation between an IQ signal transmitted by a gain execution function according to the first embodiment and noise.

FIG. 6E is a diagram illustrating an example of the relation between the IQ signal transmitted by the gain execution function 120f according to the first embodiment and noise. FIG. 6E illustrates an example of a response in the depth direction. As can be seen from FIG. 6D and FIG. 6E, the noise reduction effect by the DnCNN 120d is high, and for example, according to NPL 1, a peak signal to noise ratio (PSNR) is improved by about 32 dB. Furthermore, as can be seen from FIG. 6E, the level of the IQ signal is constant or substantially constant at all depths. In addition, there is almost no blurring of the edges of an image.

As described above, the noise reduction processing circuitry 120 according to the first embodiment includes the reverse gain execution function 120a that performs a process on an IQ signal in digital form so that the level of noise included in the IQ signal in digital form is made constant, and the DnCNN processing function 120c and the DnCNN 120d that perform a process of reducing the noise included in the IQ signal on the IQ signal in digital form subjected to the process of making the level of the noise constant. The process of making the level of the noise included in the IQ signal constant is an example of a third process. The process of reducing the noise included in the IQ signal is an example of a fourth process. The noise reduction processing circuitry 120 is an example of processing circuitry.

Furthermore, as the process of making the level of the noise included in the IQ signal constant, the reverse gain execution function 120a performs a process of multiplying the IQ signal by a gain opposite to a gain that changes with depth in ATGC, or making the sum of white noise included in the IQ signal and quantization noise constant at all depths, the quantization noise being generated when a process is performed to convert a received signal subjected to the ATGC into a received signal in digital format.

Furthermore, as the process of reducing the noise included in the IQ signal, the DnCNN processing function 120c inputs the IQ signal subjected to the process of making the level of the noise included in the IQ signal constant to the DnCNN 120d, which is a neural network that outputs noise included in an input signal, and causes the DnCNN 120d to output the noise included in the IQ signal. Then, as the process of reducing the noise included in the IQ signal, the subtractor 120e performs a process of reducing the noise included in the IQ signal by subtracting the noise output from the DnCNN 120d from the IQ signal.

As described above, the beamformer 130 according to the first embodiment performs beamforming on the IQ signal from which the noise has been reduced by the process of reducing the noise included in the IQ signal.

In the above, two-dimensional data (two-dimensional IQ signal) in the channel direction and the depth direction has been described as an example of a target of processing performed for each transmission of ultrasonic waves. However, the DnCNN processing function 120c may use an IQ signal obtained by transmitting ultrasonic waves a plurality of times, and input, to the DnCNN 120d, a three-dimensional IQ signal (three-dimensional data) composed of an axis of the number of ultrasonic wave transmissions (direction of the number of transmissions), a channel axis (channel direction), and a depth axis (depth direction). That is, the DnCNN 120d may have a three-dimensional support structure (three-dimensional configuration). This allows the DnCNN 120d to estimate noise and output the estimated noise to the subtractor 120e.

Furthermore, when there are variations in sensitivity between channels, a noise level is not spatially constant. In this case, the ultrasonic diagnostic apparatus 1 measures sensitivity in advance and performs gain correction so that noise is constant. For example, the reverse gain execution function 120a first measures sensitivity by observing a received signal of each channel in a state where no ultrasonic waves are transmitted. Specifically, the reverse gain execution function 120a measures variations in sensitivity between channels and calculates a root mean square (rms) of all depths for each channel. Then, the reverse gain execution function 120a multiplies the IQ signal by gain correction so that rms values at the same depth are the same for all channels. Thereafter, the reverse gain execution function 120a multiplies the IQ signal multiplied by such gain correction by a gain opposite to the gain (gain value) multiplied by the ATGC processing circuit 112b. In this way, as the process of making the level of noise included in the IQ signal constant, the reverse gain execution function 120a performs a process of making the level of noise included in the IQ signal constant in all channels and at all depths, on the basis of variations in sensitivity between channels.

Figure 7:
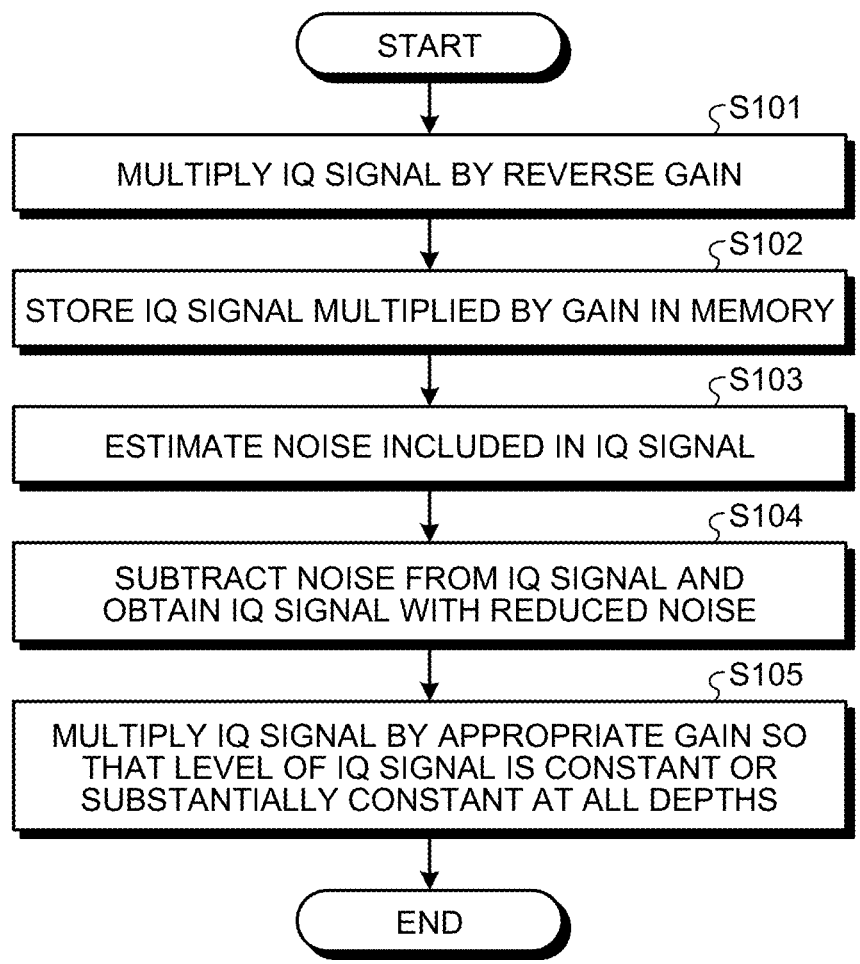
FIG. 7 is a flowchart illustrating an example of the flow of a process performed by the noise reduction processing circuitry according to the first embodiment.

FIG. 7 is a flowchart illustrating an example of the flow of a process performed by the noise reduction processing circuitry 120 according to the first embodiment.

Step S101

As illustrated in FIG. 7, at step S101, each of the reverse gain execution functions 120a multiplies an IQ signal transmitted by a corresponding demodulator 112d by a gain opposite to a gain (gain value) multiplied by the ATGC processing circuit 112b.

Step S102

At step S102, the reverse gain execution functions 120a store the two-dimensional IQ signal multiplied by the gain in the memory 120b.

Step S103

At step S103, the DnCNN processing function 120c reads the two-dimensional IQ signal stored in the memory 120b, and inputs the read two-dimensional IQ signal to the DnCNN 120d. This allows the DnCNN 120d to estimate noise and output the estimated noise to the subtractor 120e.

Step S104

At step S104, the subtractor 120e subtracts the noise estimated and output by the DnCNN 120d from the two-dimensional IQ signal transmitted by the DnCNN processing function 120c. This allows the subtractor 120e to obtain a two-dimensional IQ signal with reduced noise. Then, the subtractor 120e transmits the two-dimensional IQ signal with reduced noise to the gain execution function 120f.

Step S105

At step S105, the gain execution function 120f multiplies the IQ signal transmitted by the subtractor 120e by a gain opposite to the gain (gain value) multiplied to the IQ signal by the reverse gain execution function 120a. That is, the gain execution function 120f restores the gain. The gain execution function 120f multiplies an appropriate gain so that the level of the IQ signal is constant or substantially constant at all depths. Then, the gain execution function 120f transmits the IQ signal multiplied by the gain to the beamformer 130.

So far, the ultrasonic diagnostic apparatus 1 according to the first embodiment has been described. In the ultrasonic diagnostic apparatus according to the related art, since the noise level of a signal input to the DnCNN is not constant depending on the location, noise may not be effectively reduced. On the other hand, in the ultrasonic diagnostic apparatus 1 according to the first embodiment, the noise level of a signal input to the DnCNN 120d is constant at all locations, and noise reduction can be achieved in a state where the noise level is constant at all locations. Therefore, according to the ultrasonic diagnostic apparatus 1, noise reduction can be efficiently achieved by a method using a neural network. Furthermore, such a method of reducing noise by using the DnCNN can reduce noise without blurring signals. From the above, the ultrasonic diagnostic apparatus 1 according to the first embodiment can greatly improve the penetration of ultrasonic waves.

Second Embodiment

In the first embodiment, the case where the ultrasonic diagnostic apparatus 1 performs a process of reducing noise before beamforming has been described. However, the ultrasonic diagnostic apparatus 1 may perform the process of reducing noise after beamforming. In this regard, such an embodiment will be described as a second embodiment. In the description of the second embodiment, points different from the first embodiment will be mainly described, and the same configuration as that of the first embodiment may not be described.

Figure 8:
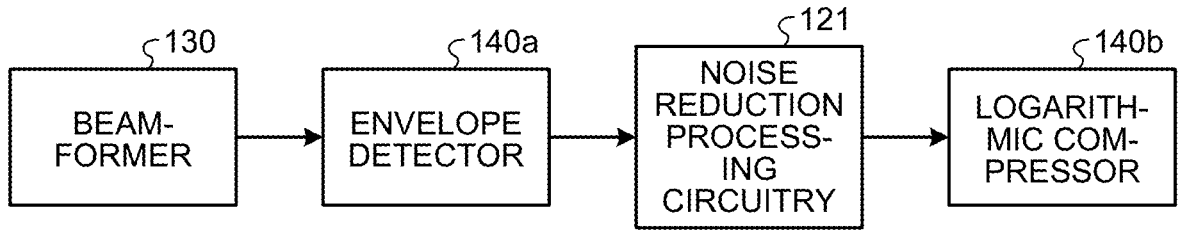
FIG. 8 is a diagram illustrating an example of a partial configuration of an ultrasonic diagnostic apparatus according to a second embodiment.

FIG. 8 is a diagram illustrating an example of a partial configuration of the ultrasonic diagnostic apparatus 1 according to the second embodiment. Noise reduction processing circuitry 121 according to the second embodiment is different from the noise reduction processing circuitry 120 according to the first embodiment in that the noise reduction processing circuitry 121 is provided after the beamformer 130. For example, the signal processing circuitry 140 includes an envelope detector 140a and a logarithmic compressor 140b. In the second embodiment, the noise reduction processing circuitry 121 is provided between the envelope detector 140a and the logarithmic compressor 140b. That is, the noise reduction processing circuitry 121 is provided in a subsequent stage of the envelope detector 140a and in a previous stage of the logarithmic compressor 140b. The noise reduction processing circuitry 121 is an example of processing circuitry.

For example, in the second embodiment, the envelope detector 140a detects an envelope of reflected wave data, the noise reduction processing circuitry 121 performs a process of reducing noise included in data related to the envelope obtained by the envelope detection (for example, data indicating an amplitude of the reflected wave data, and the like), and the logarithmic compressor 140b logarithmically compresses the envelope-related data with reduced noise, so that B-mode data is generated in the signal processing circuitry 140. In this way, data input to the noise reduction processing circuitry 121 and output from the noise reduction processing circuitry 121 are real number data. Furthermore, data input to the noise reduction processing circuitry 121, data handled in the noise reduction processing circuitry 121, and data output from the noise reduction processing circuitry 121 are examples of received signals.

In the second embodiment, the beamformer 130 generates reflected wave data by performing a phasing addition process (delay addition process) on an IQ signal transmitted by the receiver circuit 112. For example, the beamformer 130 gives a delay time required for determining reception directivity to an IQ signal for each channel. Then, the beamformer 130 generates the reflected wave data by adding the IQ signals given the delay times. The beamformer 130 transmits the generated reflected wave data to the signal processing circuitry 140. The beamformer 130 according to the second embodiment has a variable aperture in which the number of channels to be added changes with depth. That is, in the second embodiment, the beamformer 130 performs beamforming on an IQ signal to change the number of channels to be added with depth.

Figure 9:
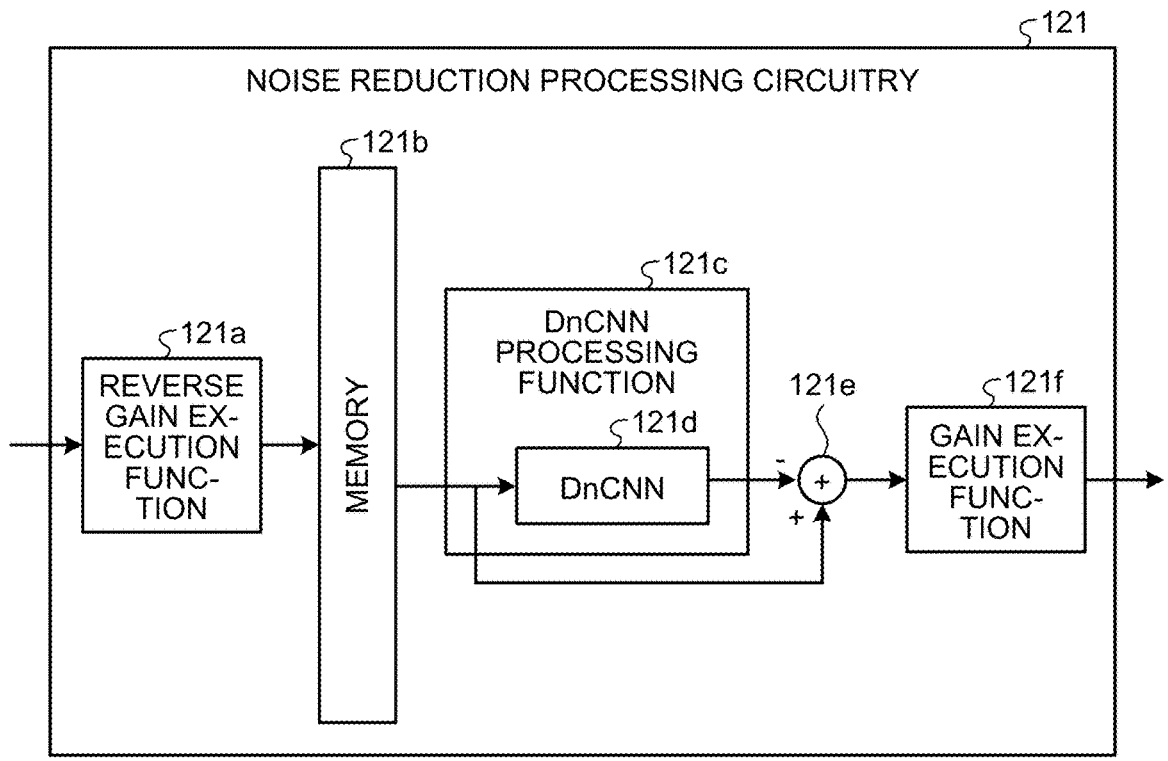
FIG. 9 is a diagram illustrating an example of the configuration of noise reduction processing circuitry according to the second embodiment.

FIG. 9 is a block diagram illustrating an example of the configuration of the noise reduction processing circuitry 121 according to the second embodiment. As illustrated in FIG. 9, the noise reduction processing circuitry 121 includes a reverse gain execution function 121a, a memory 121b, a DnCNN processing function 121c, a subtractor 121e, and a gain execution function 121f.

For example, respective processing functions performed by the reverse gain execution function 121a, the DnCNN processing function 121c, and the gain execution functions 121f, which are components of the noise reduction processing circuitry 121 illustrated in FIG. 9, are recorded in the storage circuitry 170 in the form of computer programs executable by a computer. The noise reduction processing circuitry 121 is, for example, a processor, and reads the computer programs from the storage circuitry 170 and executes the read computer programs, thereby implementing functions corresponding to the executed computer programs. In other words, the noise reduction processing circuitry 121 in the state of reading the computer programs has the functions shown in the noise reduction processing circuitry 121 in FIG. 9.

FIG. 9 illustrates the case where respective processing functions of the reverse gain execution function 121a, the DnCNN processing function 121c, and the gain execution functions 121f are implemented by a single processing circuitry (noise reduction processing circuitry 121); however, the embodiment is not limited thereto. For example, the noise reduction processing circuitry 121 may be configured by combining a plurality of independent processors, and respective processors may implement respective processing functions by executing respective computer programs. Furthermore, respective processing functions of the noise reduction processing circuitry 121 may be implemented by being appropriately distributed or integrated into a single processing circuit or a plurality of processing circuities.

As described above, the beamformer 130 according to the second embodiment has a variable aperture in which the number of channels to be added changes with depth. In this regard, the reverse gain execution function 121a according to the second embodiment receives the envelope-related data transmitted by the envelope detector 140a. Then, the reverse gain execution function 121a multiplies the received envelope-related data by a gain based on the gain (gain value) multiplied to the IQ signal by the ATGC processing circuit 112b and the number of channels to be added that changes with depth in the variable aperture.

For example, the reverse gain execution function 121a multiplies the envelope-related data by a gain GainComp (x, z) obtained by the following Equation (1).

$$GainComp(x, z) = \frac{1}{ATGC(x, z)\sqrt{M(x, z)}} \quad (1)$$

In Equation (1) above, ATGC (x, z) indicates the gain (linear scale) multiplied to the IQ signal by the ATGC processing circuit 112b at a received raster number x at depth z. Furthermore, M(x,z) indicates the number of channels to be added at the depth z.

The reverse gain execution function 121a multiplies the envelope-related data by the product of a reciprocal of the gain (gain value) multiplied by the ATGC processing circuit 112b and a reciprocal of the positive square root of the number of channels added at the depth z, according to Equation (1). In this way, the reverse gain execution function 121a performs a process on the envelope-related data so that the level of noise included in the envelope-related data is made constant at all depths. Accordingly, the noise does not change with depth and is spatially uniform. Consequently, the data multiplied by the gain by the reverse gain execution function 121a can be applied to a DnCNN 121d that estimates noise. As described above, in the second embodiment, as a process of making the level of noise included in the envelope-related data constant, the reverse gain execution function 121a performs a process on data obtained by the beamforming performed by the beamformer 130, on the basis of the number of channels to be added that changes with depth so that the level of noise included in the data obtained by the beamforming is made constant.

Then, the reverse gain execution function 121a stores the data multiplied by the gain in the memory 121b. Specifically, the memory 121b has a two-dimensional storage area composed of an axis of a received raster (received raster direction) and an axis of a depth (depth direction). Then, the reverse gain execution function 121a stores the data multiplied by the gain at a corresponding position in the storage area of the memory 121b. Accordingly, two-dimensional data with the received raster and the depth is stored in the storage area of the memory 121b.

The DnCNN processing function 121c includes the DnCNN 121d. For example, the DnCNN 121d is stored in an internal memory of the noise reduction processing circuitry 121. The DnCNN processing function 121c reads the two-dimensional data stored in the storage area of the memory 121b, and inputs the read two-dimensional data to the DnCNN 121d. In this way, the DnCNN processing function 121c causes the DnCNN 121d to estimate noise (residual). Furthermore, the DnCNN processing function 121c transmits the read two-dimensional data to the subtractor 121e.

The DnCNN 121d estimates noise (noise component) included in the input two-dimensional data and outputs the estimated noise to the subtractor 121e. For example, the DnCNN 121d is a two-dimensional DCNN. Various internal parameters, such as coefficients of the DnCNN 121d, are determined by, for example, the same learning as that performed for the DnCNN 120d described above.

The noise level of the ultrasonic diagnostic apparatus 1 changes depending on the ultrasonic probe 101 and apparatus conditions (conditions of the ultrasonic diagnostic apparatus 1). Therefore, the learning device may cause the DnCNN 121d to learn at each of a plurality of noise levels and generate, for each noise level, the DnCNN 121d having internal parameters corresponding to each of the noise levels. That is, the learning device may generate a plurality of DnCNNs 121d corresponding to the noise levels. Then, the noise reduction processing circuitry 121 may hold the DnCNNs 121d generated by the learning device, select a DnCNN 121d that matches a noise level corresponding to the ultrasonic probe 101 and the apparatus conditions among the DnCNNs 121d, and estimate noise included in the two-dimensional data by using the selected DnCNN 121d.

The noise reduction processing circuitry 121 may hold SNR-related data as disclosed in PTL 1 as an index for adjusting the internal parameters of the DnCNN 121d, and adjust the internal parameters of the DnCNN 121d when estimating noise by the same method as that disclosed in PTL 1.

The subtractor 121e subtracts the noise estimated and output by the DnCNN 121d from the two-dimensional data (original signal) transmitted by the DnCNN processing function 121c. This allows the subtractor 121e to obtain two-dimensional data with reduced noise. The two-dimensional data is two-dimensional data composed of the axis of the received raster (received raster direction) and the axis of the depth (depth direction). Then, the subtractor 121e transmits the two-dimensional data with reduced noise to the gain execution function 121f.

The gain execution function 121f multiplies the two-dimensional data transmitted by the subtractor 121e by a gain opposite to the gain (gain value) multiplied to the data by the reverse gain execution function 121a. That is, the gain execution function 121f restores the gain. Then, the gain execution function 121f transmits the two-dimensional data multiplied by the gain to the beamformer 130.

In the first embodiment, data input to the DnCNN 120d is two-dimensional data (two-dimensional IQ signal) with channel and depth. Therefore, in the first embodiment, since the DnCNN 120d is operated for each transmission of ultrasonic waves to reduce noise, it is not affected by movement. On the other hand, in the second embodiment, since the DnCNN 121d is operated after transmitting ultrasonic waves for one frame and obtaining a total reflected wave signal, when there is movement in a living body, it is affected by the movement of the living body. However, unlike CNN for normal signals, the influence of movement of a living body is small in the DnCNN 121d that outputs noise.

In the above, two-dimensional data in the receiving raster direction and the depth direction has been described as an example of a target of processing performed for each frame at a time. However, the DnCNN processing function 121c may input three-dimensional data composed of a frame direction, a receiving raster direction, and a depth direction to the DnCNN 121d by using data of a plurality of frames. That is, the DnCNN 121d may have a three-dimensional support structure (three-dimensional configuration). This allows the DnCNN 121d to estimate noise and output the estimated noise to the subtractor 121e. Furthermore, the DnCNN processing function 121c may perform a process of improving S/N by adding the same locations of a plurality of frames.

Furthermore, the noise reduction processing circuitry 121 may be provided between the beamformer 130 and the envelope detector 140a. In this case, data input to the noise reduction processing circuitry 121 and noise-reduced data output from the noise reduction processing circuitry 121 are complex number data.

Furthermore, the noise reduction processing circuitry 121 may be provided after the logarithmic compressor 140b. In such a case, the reverse gain execution function 121a or the DnCNN processing function 121c of the noise reduction processing circuitry 121 performs an inverse transform of the logarithmic compression performed by the logarithmic compressor 140b on input data. Then, the DnCNN processing function 121c inputs the inversely transformed data to the DnCNN 121d and causes the DnCNN 121d to estimate noise and output the estimated noise. Then, the gain execution function 121f logarithmically compresses the noise-reduced data again. The DnCNN processing function 121c may input the logarithmically compressed data to the DnCNN 121d as is.

So far, the ultrasonic diagnostic apparatus 1 according to the second embodiment has been described above. The ultrasonic diagnostic apparatus 1 according to the second embodiment obtains the same effects as those of the ultrasonic diagnostic apparatus 1 according to the first embodiment.

Third Embodiment

In the first embodiment, the case where the DnCNN processing function 120c reads the two-dimensional IQ signal stored in the memory 120b and inputs the read two-dimensional IQ signal to the DnCNN 120d without processing the read two-dimensional IQ signal. However, the DnCNN processing function 120c may process the two-dimensional IQ signal and input the processed two-dimensional IQ signal to the DnCNN 120d. such an embodiment will be described as a third embodiment. In the description of the third embodiment, points different from the first embodiment will be mainly described, and the same configuration as that of the first embodiment may not be described.

Figure 10:
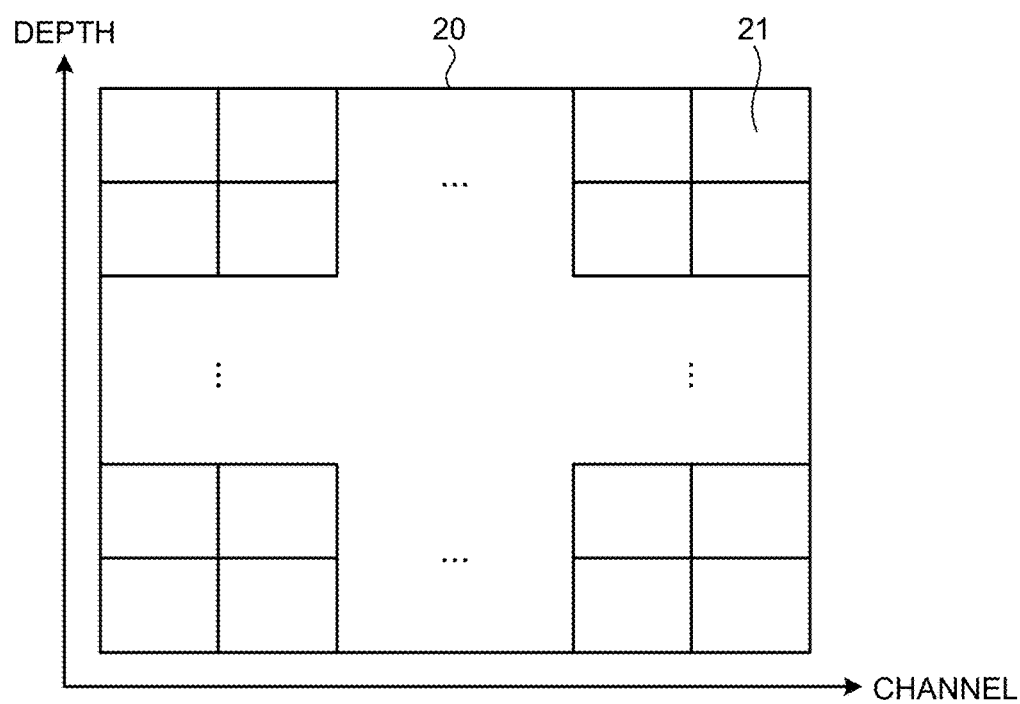
FIG. 10 is a diagram for explaining an example of a process performed by a DnCNN processing function according to a third embodiment.
Figure 11:
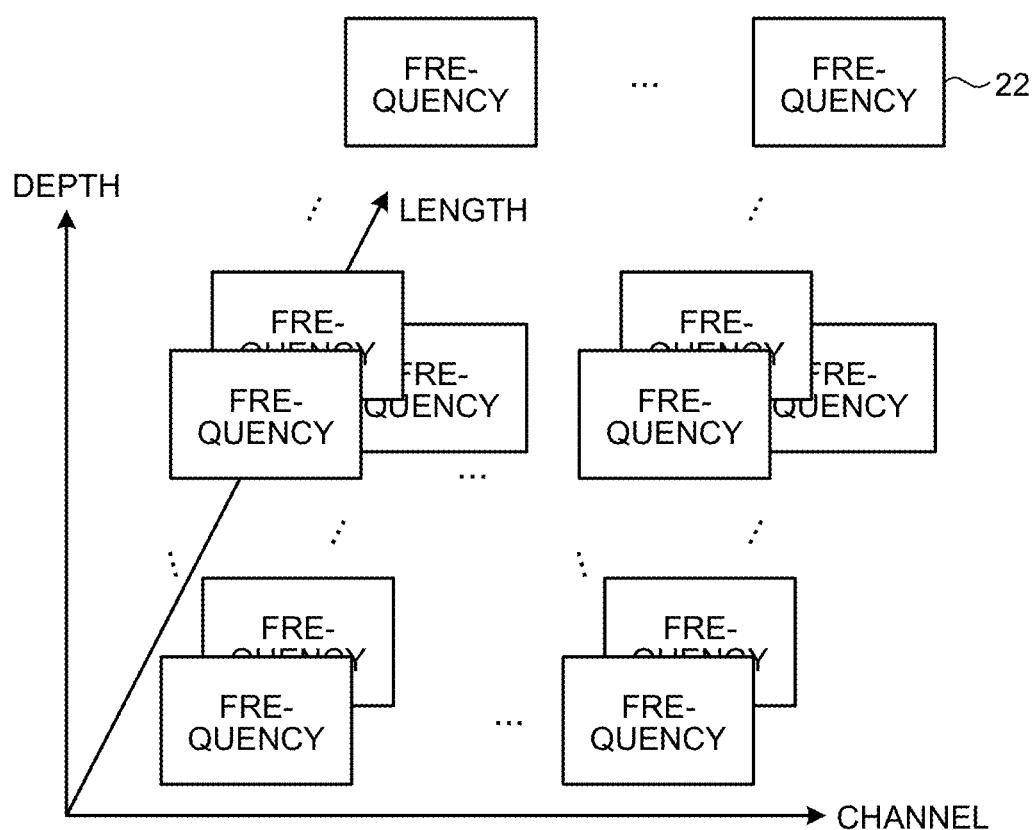
FIG. 11 is a diagram for explaining an example of a process performed by the DnCNN processing function according to a third embodiment.

FIG. 10 and FIG. 11 are diagrams illustrating an example of a process performed by the DnCNN processing function 120c according to the third embodiment. In the third embodiment, the DnCNN processing function 120c reads a two-dimensional IQ signal (two-dimensional data) 20 illustrated in FIG. 10 from the memory 120b. Hereinafter, a case where the two-dimensional IQ signal 20 is data in which "CH0" IQ signals are arranged in the channel direction and "D0" IQ signals are arranged in the depth direction and is data composed of "CH0"×"D0" IQ signals will be described as an example.

Then, the DnCNN processing function 120c transmits the read two-dimensional IQ signal 20 to the subtractor 120e. Furthermore, the DnCNN processing function 120c divides the read two-dimensional IQ signal 20 into a plurality of regions 21. Hereinafter, a case where the region 21 is data in which "CH1" IQ signals are arranged in the channel direction and "D1" IQ signals are arranged in the depth direction and is data composed of "CH1"×"D1" IQ signals will be described as an example. In this case, the DnCNN processing function 120c divides the two-dimensional IQ signal 20 into a plurality of "CHn"×"Dn" regions 21. Note that "CHn"="CH0"/"CH1" and "Dn"="D0"/"D1".

Then, the DnCNN processing function 120c performs a two-dimensional discrete cosine transform (DCT) on each of the regions 21, and transforms each of the regions 21 into a frequency 22 (see FIG. 11). One region 21 is transformed into "CH1"×"D1" frequencies 22 by the two-dimensional discrete cosine transform.

The DnCNN processing function 120c uses the "CH1"× "D1" frequencies 22 corresponding to one region 21 as length data of data input to the DnCNN 120d (input data). For example, as illustrated in FIG. 11, the DnCNN processing function 120c arranges the "CH1"×"D1" frequencies 22 corresponding to each region 21 in a length direction. That is, in the example of FIG. 11, a set of the "CH1"×"D1" frequencies 22 arranged in the length direction is arranged by "CHn" in the channel direction and "Dn" in the depth direction.

In the field of CNN, the term "channel" is commonly used instead of "length", but in order to distinguish it from the aforementioned channel in the ultrasonic diagnostic apparatus 1, it is referred to as the length of input data or a feature map.

The DnCNN processing function 120c inputs, to the DnCNN 120d, the set of the "CH1"×"D1" frequencies 22 corresponding to each region 21 and arranged in the length direction. In this way, the DnCNN processing function 120c causes the DnCNN 120d to estimate noise (residual). Furthermore, the DnCNN processing function 120c transmits, to the subtractor 120e, the set of the "CH1"×"D1" frequencies 22 corresponding to each region 21 and arranged in the length direction.

The DnCNN 120d estimates noise (noise component) included in the input set of the "CH1"×"D1" frequencies 22 and outputs the estimated noise. That is, the DnCNN 120d outputs noise corresponding to each region 21. Various internal parameters, such as coefficients of the DnCNN 120d according to the third embodiment, are determined by, for example, the same learning as that performed for the DnCNN 120d according to the first embodiment described above.

The DnCNN processing function 120c acquires the noise output by the DnCNN 120d and corresponding to each region 21. Then, the DnCNN processing function 120c performs a two-dimensional discrete inverse cosine transform on the acquired noise corresponding to each region 21, and transforms the noise corresponding to each region 21 into "CH1"×"D1" signals. For example, such a transformed signal is noise included in an IQ signal corresponding to each region 21.

The DnCNN processing function 120c performs such a process for all the "CHn"×"Dn" regions 21. Accordingly, the DnCNN processing function 120c acquires "CH0"×"D0" two-dimensional signals corresponding to all the regions 21. Such "CH0"×"D0" two-dimensional signals are noise included in the two-dimensional IQ signal 20. Then, the DnCNN processing function 120c transmits the acquired "CH0"×"D0" two-dimensional signals to the subtractor 120e.

The subtractor 120e subtracts the "CH0"×"D0" two-dimensional signals (noise) transmitted by the DnCNN processing function 120c from the two-dimensional IQ signal (original signal) 20 transmitted by the DnCNN processing function 120c. This allows the subtractor 120e to obtain a two-dimensional IQ signal with reduced noise. Then, the subtractor 120e transmits the two-dimensional IQ signal with reduced noise to the gain execution function 120f. The gain execution function 120f according to the third embodiment performs the same processes as those performed by the gain execution function 120f according to the first embodiment.

As described above, in the third embodiment, the DnCNN processing function 120c divides the IQ signal 20 into the regions 21 as a process of reducing noise included in the IQ signal 20, the IQ signal 20 being subjected to a process of making the level of noise constant. Then, the DnCNN processing function 120c performs a predetermined orthogonal transform on each of the regions 21 to acquire the frequencies 22 corresponding to each of the regions 21. Then, the DnCNN processing function 120c uses the frequencies 22 corresponding to each of the regions 21 as length data of data input to a neural network, and performs an inverse transform of the predetermined orthogonal transform on output of the neural network.

So far, the ultrasonic diagnostic apparatus 1 of the third embodiment has been described. The ultrasonic diagnostic apparatus 1 according to the third embodiment obtains the same effects as those of the ultrasonic diagnostic apparatus 1 according to the first embodiment.

The noise reduction processing circuitry 120 according to the third embodiment divides the two-dimensional IQ signal 20 into the regions 21 and performs a discrete cosine transform to transfer the statistical properties of the signal more strongly to the DnCNN 120d, thereby causing the DnCNN 120d to easily separate a signal component and a noise component. The noise reduction processing circuitry 120 may perform a Karhunen-Loeve transform instead of the discrete cosine transform. The Karhunen-Loeve transform is an orthogonal transform that concentrates energy as much as possible in the lower orders, and the discrete cosine transform has properties similar to this. The noise reduction processing circuitry 120 performs such an orthogonal transform, so that it becomes easy for the DnCNN 120d to efficiently extract residuals (noise). In addition, the noise reduction processing circuitry 120 can also use other orthogonal transforms such as a discrete Fourier transform and a discrete wavelet transform.

The noise reduction processing circuitry 120 according to the third embodiment can also learn to make output after inverse transform a noise-reduced signal instead of residuals, and output the output as is without subtracting the output from an original signal.

Fourth Embodiment

In the first embodiment to the third embodiment, the case where the noise reduction processing circuitries 120 and 121 reduce noise by using a neural network has been described. However, the noise reduction processing circuitries 120 and 121 may reduce noise without using a neural network. In this regard, such an embodiment will be described as a fourth embodiment. In the description of the fourth embodiment, points different from the first embodiment will be mainly described, and the same configuration as that of the first embodiment may not be described.

Figure 12:
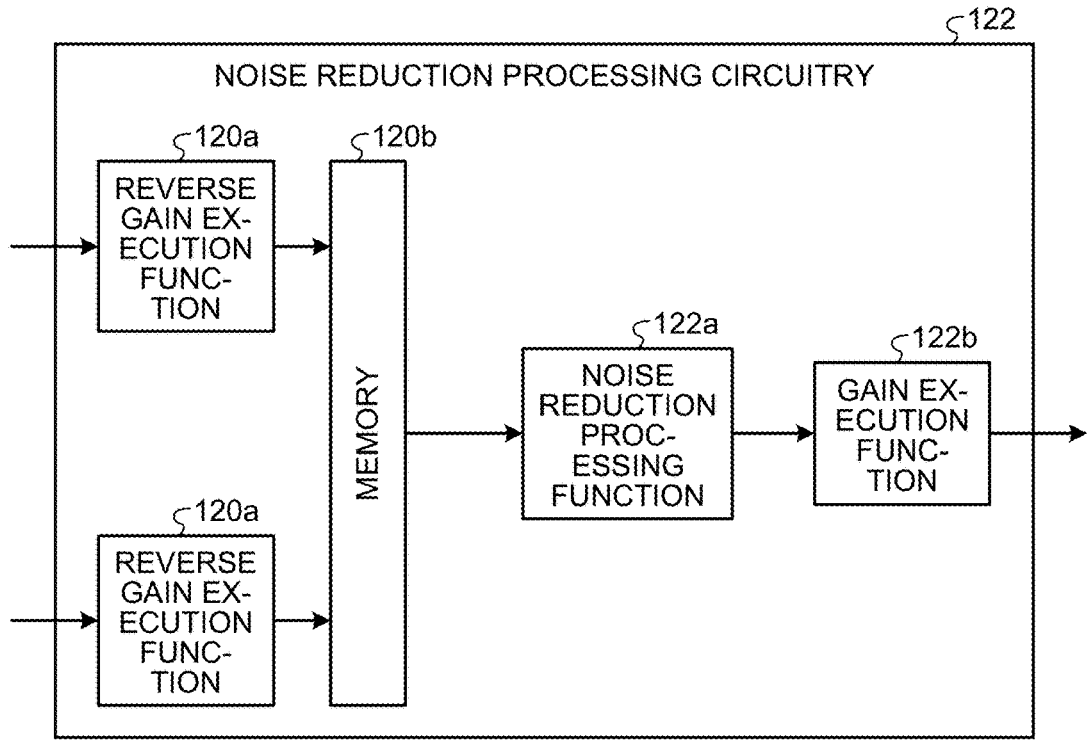
FIG. 12 is a diagram illustrating an example of the configuration of noise reduction processing circuitry according to a fourth embodiment.

FIG. 12 is a diagram illustrating an example of the configuration of noise reduction processing circuitry 122 according to the fourth embodiment. An ultrasonic diagnostic apparatus 1 according to the fourth embodiment is different from the ultrasonic diagnostic apparatus 1 according to the first embodiment in that it has the noise reduction processing circuitry 122 illustrated in FIG. 12 instead of the noise reduction processing circuitry 120 illustrated in FIG. 5. Furthermore, the noise reduction processing circuitry 122 according to the fourth embodiment is different from the noise reduction processing circuitry 120 according to the first embodiment in that it has a noise reduction processing function 122a instead of the DnCNN processing function 120c, the DnCNN 120d, and the subtractor 120e. The noise reduction processing circuitry 122 according to the fourth embodiment is different from the noise reduction processing circuitry 120 according to the first embodiment in that it has a gain execution function 122b instead of the gain execution function 120f. The noise reduction processing circuitry 122 is an example of processing circuitry.

For example, respective processing functions performed by the reverse gain execution functions 120a, the noise reduction processing function 122a, and the gain execution function 122b, which are components of the noise reduction processing circuitry 122 illustrated in FIG. 12, are recorded in the storage circuitry 170 in the form of computer programs executable by a computer. The noise reduction processing circuitry 122 is, for example, a processor, and reads the computer programs from the storage circuitry 170 and executes the read computer programs, thereby implementing functions corresponding to the executed computer programs. In other words, the noise reduction processing circuitry 122 in the state of reading the computer programs has the functions shown in the noise reduction processing circuitry 122 in FIG. 12.

FIG. 12 illustrates the case where respective processing functions of the reverse gain execution functions 120a, the noise reduction processing function 122a, and the gain execution function 122b are implemented by a single processing circuitry (noise reduction processing circuitry 122); however, the embodiment is not limited thereto. For example, the noise reduction processing circuitry 122 may be configured by combining a plurality of independent processors, and respective processors may implement respective processing functions by executing respective computer programs. Furthermore, respective processing functions of the noise reduction processing circuitry 122 may be implemented by being appropriately distributed or integrated into a single processing circuit or a plurality of processing circuities.

Figure 13:
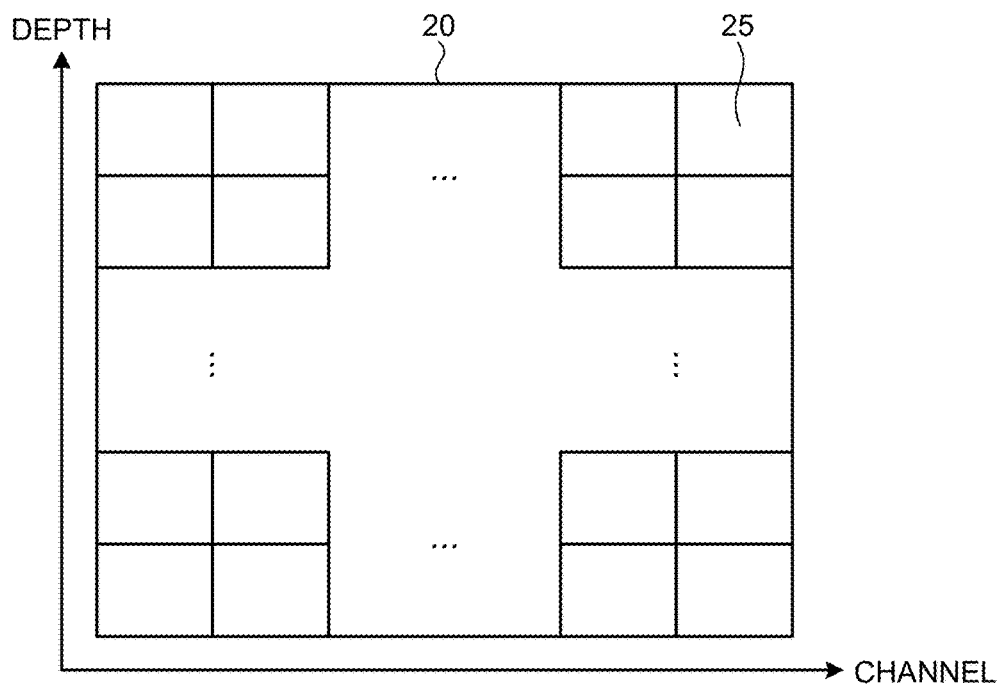
FIG. 13 is a diagram for explaining an example of a process performed by a noise reduction processing function according to the fourth embodiment.

FIG. 13 is a diagram for explaining an example of a process performed by the noise reduction processing function 122a according to the fourth embodiment. The noise reduction processing function 122a reads the two-dimensional IQ signal 20 illustrated in FIG. 13 from the memory 120b, and divides the read two-dimensional IQ signal 20 into a plurality of regions 25.

Then, the noise reduction processing function 122a calculates a covariance matrix from the regions 25 for each region 25. In this way, a plurality of covariance matrices corresponding to all the regions 25 are calculated. Then, the noise reduction processing function 122a adds the covariance matrices corresponding to all the regions 25. In this way, one matrix is obtained.

Then, the noise reduction processing function 122a performs eigenvalue decomposition on the one matrix obtained by adding the covariance matrices, and calculates a filter matrix that outputs only a predetermined number of higher eigenvalues (principal components).

Then, the noise reduction processing function 122a acquires only principal components by applying a filter matrix to each region 25. Then, the noise reduction process-ing function 122a acquires a principal component signal as a whole by integrating all the principal components corresponding to all the regions 25. This principal component signal is a signal from which a non-principal signal has been removed, that is, a signal from which a residual (noise) signal has been removed or reduced. This method is the same as performing a Karhunen-Loeve orthogonal transform and applying filtering on a frequency axis to perform inverse transform. That is, it is the same as in the previous third embodiment where the ultrasonic diagnostic apparatus 1 performs a Karhunen-Loeve transform instead of the discrete cosine transform, applies filtering on a frequency axis instead of the DnCNN 120d, and performs Karhunen-Loeve inverse transform instead of the discrete cosine inverse transform. As the orthogonal transforms, in addition to the Karhunen-Loeve transform that changes adaptively to input data, discrete Fourier transform, discrete cosine transform, discrete wavelet transform, and the like, which are fixed orthogonal transforms, can be used. These inverse transforms can also be used. That is, the noise reduction processing function 122a reduces noise by using a predetermined orthogonal transform and an inverse transform of the predetermined orthogonal transform.

The noise reduction processing function 122a according to the fourth embodiment divides the IQ signal 20 into the regions 25 as a noise reduction process, the IQ signal 20 being subjected to a process of making the level of noise constant. Then, the noise reduction processing function 122a reduces noise by performing principal component analysis, Karhunen-Loeve transform, or eigenvalue decomposition on each of the regions 25. The noise reduction processing function 122a may reduce noise by performing singular value decomposition on each of the regions 25. Furthermore, the noise reduction processing function 122a may reduce noise by performing a process mathematically equivalent to at least one of the principal component analysis, the Karhunen-Loeve transform, the eigenvalue decomposition, or the singular value decomposition on each of the regions 25. Furthermore, the noise reduction processing function 122a may reduce noise included in each of the regions 25 by using statistical properties.

So far, the ultrasonic diagnostic apparatus 1 of the fourth embodiment has been described. The ultrasonic diagnostic apparatus 1 according to the fourth embodiment obtains the same effects as those of the ultrasonic diagnostic apparatus 1 according to the first embodiment.

Fifth Embodiment

In the first embodiment to the fourth embodiment, the case where the ultrasonic diagnostic apparatus 1 performs various processes has been described, but a medical image processing apparatus may perform the same processes as the various processes performed by the ultrasonic diagnostic apparatus 1. In this regard, such an embodiment will be described as a fifth embodiment. In the description of the fifth embodiment, points different from the first embodiment will be mainly described, and the same configuration as that of the first embodiment may not be described.

Figure 14:
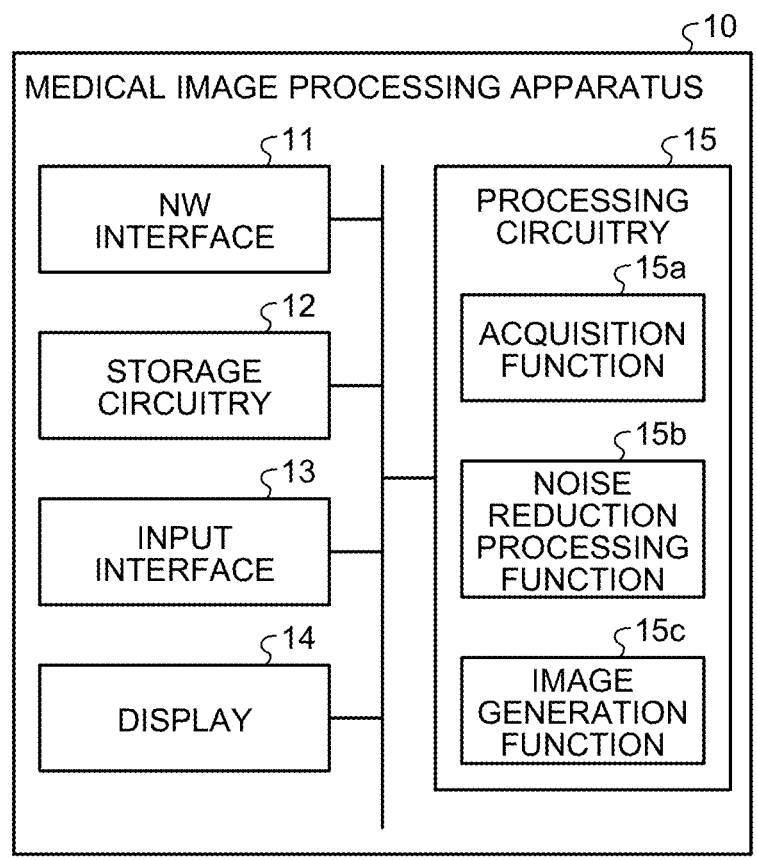
FIG. 14 is a diagram illustrating an example of the configuration of a medical image processing apparatus according to a fifth embodiment.

FIG. 14 is a diagram illustrating an example of the configuration of a medical image processing apparatus 10 according to the fifth embodiment. The medical image processing apparatus 10 acquires the IQ signal in digital form converted from the RF signal by the demodulator 112d from the ultrasonic diagnostic apparatus 1 via the network. This IQ signal is a received signal in digital form converted from a received signal in analog form subjected to the process of multiplying a gain while changing the gain with depth. Then, the medical image processing apparatus 10 performs the same processes as those performed by the ultrasonic diagnostic apparatus 1 on the acquired IQ signal.

As illustrated in FIG. 14, the medical image processing apparatus 10 includes a network (NW) interface 11, storage circuitry 12, an input interface 13, a display 14, and processing circuitry 15.

The NW interface 11 controls transmission and communication of various information and various data transmitted/received between the medical image processing apparatus 10 and the ultrasonic diagnostic apparatus 1. The NW interface 11 is connected to the processing circuitry 15. The NW interface 11 receives the IQ signal transmitted by the ultrasonic diagnostic apparatus 1 via the network. In this case, the NW interface 11 transmits the received IQ signal to the processing circuitry 15. For example, the NW interface 11 is implemented by a network card, a network adapter, a network interface controller (NIC), or the like.

The storage circuitry 12 is connected to the processing circuitry 15 and stores various data. For example, the storage circuitry 12 is implemented by a semiconductor memory element such as a random access memory (RAM) and a flash memory, a hard disk, or an optical disc. The storage circuitry 12 is an example of a storage unit.

The storage circuitry 12 stores various information used for the processing of the processing circuitry 15, the processing results of the processing circuitry 15, and the like.

The input interface 13 is connected to the processing circuitry 15, converts input operations received from an operator into electrical signals, and outputs the electrical signals to the processing circuitry 15. In the present specification, the input interface 13 is not limited to only those with physical operating components such as a mouse and a keyboard. For example, an example of an input interface also includes a processing circuit that receives electrical signals corresponding to input operations from an external input device provided separately from the apparatus and outputs the electrical signals to the processing circuitry 15.

For example, the input interface 13 is implemented by a trackball, a switch button, a mouse, and a keyboard for various settings and the like, a touch pad for performing an input operation by touching an operation surface, a touch screen with integrated display screen and touch pad, a non-contact input interface using an optical sensor, or a voice input interface.

The display 14 is connected to the processing circuitry 15 and displays various information and various images output from the processing circuitry 15. For example, the display 14 is implemented by a liquid crystal monitor, a cathode ray tube (CRT) monitor, or a touch panel. For example, the display 14 displays a graphical user interface (GUI) for receiving instructions from an operator, various display images, and various processing results of the processing circuitry 15. The display 14 is an example of a display unit.

The processing circuitry 15 is implemented by a processor. The processing circuitry 15 performs an acquisition function 15*a*, a noise reduction processing function 15*b*, and an image generation function 15*c*. For example, respective processing functions of the acquisition function 15*a*, the noise reduction processing function 15*b*, and the image generation function 15*c*, which are components of the processing circuitry 15 illustrated in FIG. 14, are recorded in the storage circuitry 12 in the form of computer programs executable by a computer. The processing circuitry 15 reads the computer programs from the storage circuitry 12 and executes the read computer programs, thereby implementing functions corresponding to the executed computer programs. In other words, the processing circuitry 15 in the state of reading the computer programs has the functions shown in the processing circuitry 15 in FIG. 14.

FIG. 14 illustrates the case where respective processing functions of the acquisition function 15*a*, the noise reduction processing function 15*b*, and the image generation function 15*c* are implemented by the single processing circuitry 15; however, the embodiment is not limited thereto. For example, the processing circuitry 15 may be configured by combining a plurality of independent processors, and respective processors may implement respective processing functions by executing respective computer programs. Furthermore, respective processing functions of the processing circuitry 15 may be implemented by being appropriately distributed or integrated into a single processing circuit or a plurality of processing circuits.

The acquisition function 15*a* acquires the IQ signal from the ultrasonic diagnostic apparatus 1 via the NW interface 11. Then, the acquisition function 15*a* stores the acquired IQ signal in the storage circuitry 12. The acquisition function 15*a* is an example of an acquisition unit.

The noise reduction processing function 15*b* performs the same processes as those performed by the noise reduction processing circuitry 120, the noise reduction processing circuitry 121, or the noise reduction processing circuitry 122. For example, the noise reduction processing function 15*b* reads the IQ signal stored in the storage circuitry 12, and performs, on the read IQ signal, the same processes as those performed by the noise reduction processing circuitry 120, the noise reduction processing circuitry 121, or the noise reduction processing circuitry 122. By way of an example, the noise reduction processing function 15*b* performs a process on the IQ signal to make the level of noise included in the IQ signal constant, and performs a process of reducing noise included in the IQ signal on the IQ signal subjected to the process of making the level of the noise constant. The noise reduction processing function 15*b* is an example of a noise reduction processing unit.

The image generation function 15*c* performs at least a part of the same processes as those performed by the beamformer 130, the signal processing circuitry 140, the image generation circuitry 150, and the control circuitry 180 according to the first embodiment.

However, in the fifth embodiment, when the noise reduction processing function 15*b* and the image generation function 15*c* perform the processes, the input interface 13, the display 14, and the storage circuitry 12 are used instead of the input device 102, the display 103, the image memory 160, and the storage circuitry 170 according to the first embodiment.

So far, the medical image processing apparatus 10 according to the fifth embodiment has been described. The medical image processing apparatus 10 according to the fifth embodiment obtains the same effects as those of the ultrasonic diagnostic apparatus 1 of any of the first embodiment to the fourth embodiment.

The term "processor" used in the above description, for example, means a circuit such as a central processing unit (CPU), a graphics processing unit (GPU), an application specific integrated circuit (ASIC), a programmable logic device (for example, a simple programmable logic device (SPLD)), a complex programmable logic device (CPLD), or a field programmable gate array (FPGA). The processor implements functions by reading the computer programs stored in the storage circuitry 170 and executing the read computer programs. Instead of storing the computer programs in the storage circuitry 170, the computer programs may be directly incorporated in the circuit of the processor. In this case, the processor implements the functions by reading and executing the computer programs incorporated in the circuit. Each processor according to the present embodiment is not limited to being configured as a single circuit for each processor, and one processor may be configured by combining a plurality of independent circuits to implement the functions thereof. Moreover, the circuits in FIG. 4 and FIG. 5 may be integrated into one processor to implement the functions thereof.

The control program may be provided by being recorded on a computer readable non-transitory storage medium, such as a CD (compact disc)-ROM, a flexible disk (FD), a CD-R (recordable), and a digital versatile disc (DVD), as a file in a format installable or executable on a computer. Furthermore, the control program may be provided or distributed by being stored on a computer connected to a network such as the Internet and downloaded via the network. For example, the control program is configured as a module including the aforementioned each processing function. As actual hardware, the processor reads and executes the computer program from the storage medium such as a ROM, so that each module is loaded on a main storage device and generated on the main storage device According to at least one embodiment or modification described above, noise reduction can be effectively achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrasonic diagnostic apparatus comprising:
a receiver circuit configured to perform a first process of multiplying a gain by a received signal in analog form while changing the gain with depth, and to perform a second process of converting the received signal subjected to the first process into a received signal in digital form; and
processing circuitry configured to perform a third process on the received signal in digital form so that a level of noise included in the received signal in digital form is made spatially uniform by performing a process of multiplying the received signal in digital form by a gain opposite to the gain that changes with depth in the first process, to perform a fourth process of reducing spatially and uniformly the level of the noise included in the received signal on the received signal in digital form subjected to the third process, and to perform a fifth process of multiplying a gain by the received signal from which the noise is reduced by the fourth process, wherein
the processing circuitry, as the fourth process,
inputs the received signal in digital form subjected to the third process to a neural network trained to, in response to an input of an additive signal which is acquired by adding a noise signal including noise, a level of the noise included in the noise signal being spatially uniform and the neural network assuming that noise included in a signal input to the neural network is spatially uniform, to a signal including no noise, output a signal corresponding to the noise signal,
acquires a signal corresponding to the noise signal from the neural network, and
reduces spatially and uniformly the level of the noise included in the received signal in digital form subjected to the third process by subtracting the acquired signal from the received signal in digital form subjected to the third process.

2. The ultrasonic diagnostic apparatus according to claim 1, wherein as the third process, the processing circuitry further performs a process of making the level of the noise included in the received signal in digital form constant in all channels and at all depths, based on variations in sensitivity between channels.

3. The ultrasonic diagnostic apparatus according to claim 1, wherein as the fourth process, the processing circuitry performs a process of inputting the received signal in digital form subjected to the third process to a neural network that outputs noise included in an input signal, causing the neural network to output the noise included in the received signal, and subtracting the noise output from the neural network from the received signal, to reduce the noise included in the received signal.

4. The ultrasonic diagnostic apparatus according to claim 1, further comprising: a beamformer configured to perform beamforming on the received signal subjected to the fifth process.

5. The ultrasonic diagnostic apparatus according to claim 1, further comprising:
a beamformer configured to perform beamforming on the received signal in digital form converted by the second process to change a number of channels to be added with depth, wherein
the processing circuitry performs, as the third process, a process on data obtained by the beamforming performed by the beamformer, based on the basis of the number of channels to be added that changes with depth so that a level of noise included in the data obtained by the beamforming is made constant.

6. The ultrasonic diagnostic apparatus according to claim 1, wherein as the fourth process, the processing circuitry divides the received signal in digital form subjected to the third process into a plurality of regions, performs a predetermined orthogonal transform on each of the regions to acquire a plurality of frequencies corresponding to each of the regions, uses the frequencies corresponding to each of the regions as length data of data input to a neural network, and performs an inverse transform of the predetermined orthogonal transform on output of the neural network.

7. A medical image processing apparatus comprising:
processing circuitry configured to acquire a received signal in digital form converted from a received signal in analog form subjected to a first process of multiplying a gain while changing the gain with depth, to perform a second process on the received signal in digital form so that a level of noise included in the received signal in digital form is made spatially uniform by performing a third process of multiplying the received signal in digital form by a gain opposite to the gain that changes with depth, to perform a fourth process of reducing spatially and uniformly the level of the noise included in the received signal on the received signal in digital form subjected to the second process of making the level of the noise spatially uniform, and to perform a fifth process of multiplying a gain by the received signal from which the noise is reduced by the fourth process of the reducing the noise, wherein the processing circuitry, as the fourth process, inputs the received signal in digital form subjected to the second process to a neural network trained to, in response to an input of an additive signal which is acquired by adding a noise signal including noise, a level of the noise included in the noise signal being spatially uniform and the neural network assuming that noise included in a signal input to the neural network is spatially uniform, to a signal including no noise, output a signal corresponding to the noise signal, acquires a signal corresponding to the noise signal from the neural network, and reduces spatially and uniformly the level of the noise included in the received signal in digital form subjected to the second process by subtracting the acquired signal from the received signal in digital form subjected to the second process.

8. An ultrasonic diagnostic apparatus comprising:

a receiver circuit configured to perform a first process of multiplying a gain by a received signal in analog form while changing the gain with depth, and to perform a second process of converting the received signal subjected to the first process into a received signal in digital form; and processing circuitry configured to perform a third process on the received signal in digital form so that a level of noise included in the received signal in digital form is made constant, and to perform a fourth process of reducing the noise included in the received signal on the received signal in digital form subjected to the third process, wherein as the third process, the processing circuitry further performs a process of making the level of the noise included in the received signal in digital form constant in all channels and at all depths, based on variations in sensitivity between channels.

9. An ultrasonic diagnostic apparatus comprising:

a receiver circuit configured to perform a first process of multiplying a gain by a received signal in analog form while changing the gain with depth, and to perform a second process of converting the received signal subjected to the first process into a received signal in digital form; and processing circuitry configured to perform a third process on the received signal in digital form so that a level of noise included in the received signal in digital form is made constant, and to perform a fourth process of reducing the noise included in the received signal on the received signal in digital form subjected to the third process, wherein as the fourth process, the processing circuitry divides the received signal in digital form subjected to the third process into a plurality of regions, performs a predetermined orthogonal transform on each of the regions to acquire a plurality of frequencies corresponding to each of the regions, uses the frequencies corresponding to each of the regions as length data of data input to a neural network, and performs an inverse transform of the predetermined orthogonal transform on output of the neural network.

\* \* \* \* \*